Sept. 21, 1965   D. D'EUSTACHIO   3,207,258
SOUND ABSORBING SYSTEMS
Filed March 17, 1964   5 Sheets-Sheet 1
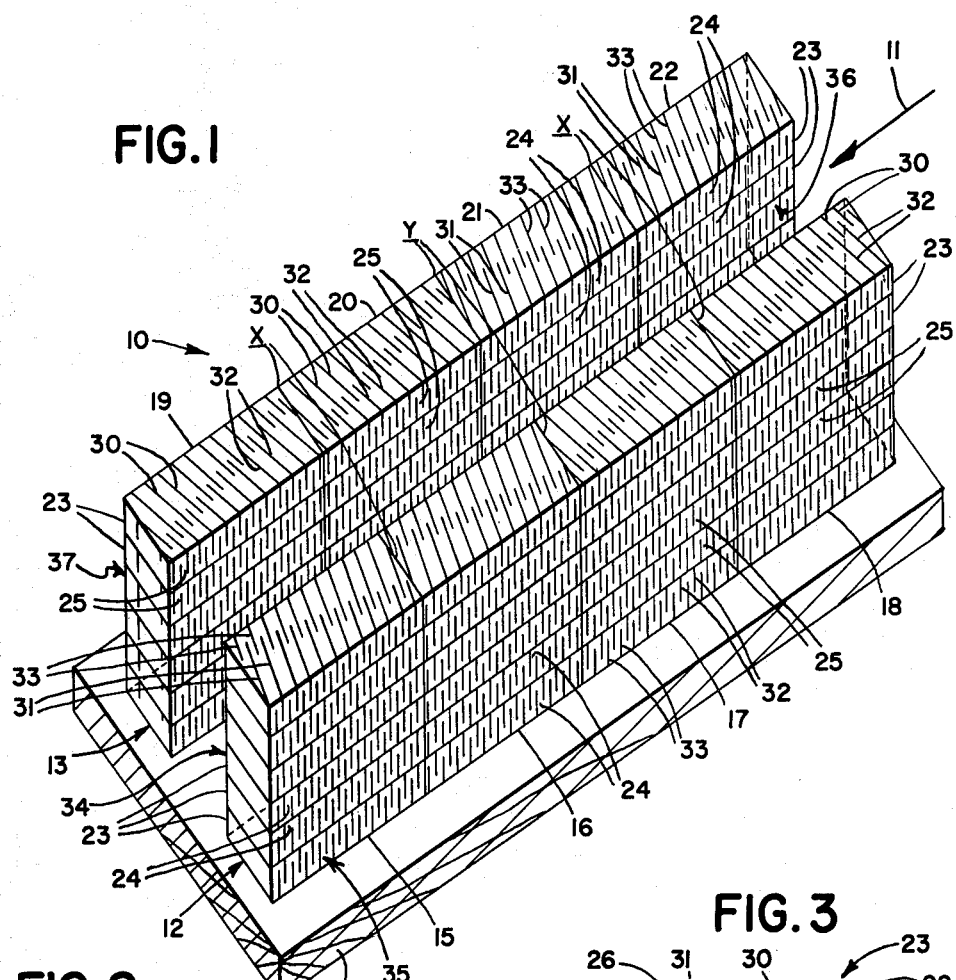
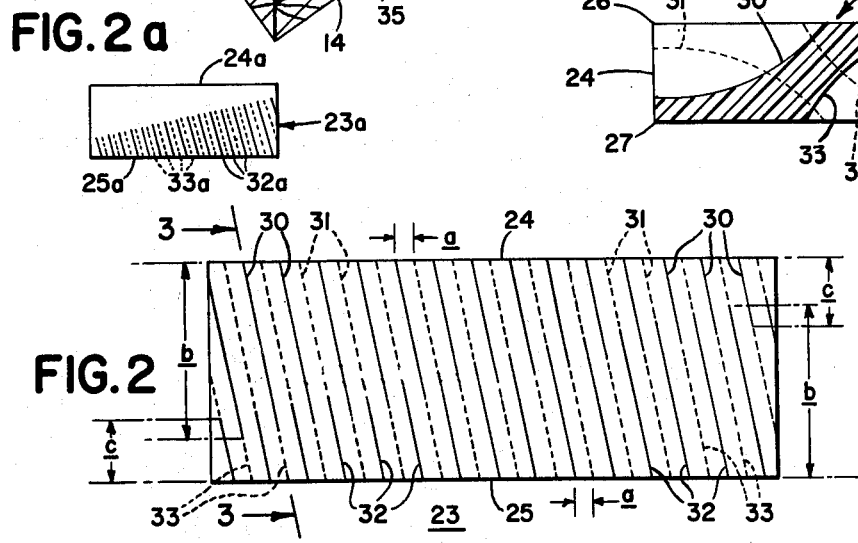

Sept. 21, 1965     D. D'EUSTACHIO     3,207,258

SOUND ABSORBING SYSTEMS

Filed March 17, 1964     5 Sheets-Sheet 2

Sept. 21, 1965 D. D'EUSTACHIO 3,207,258
SOUND ABSORBING SYSTEMS
Filed March 17, 1964 5 Sheets-Sheet 3

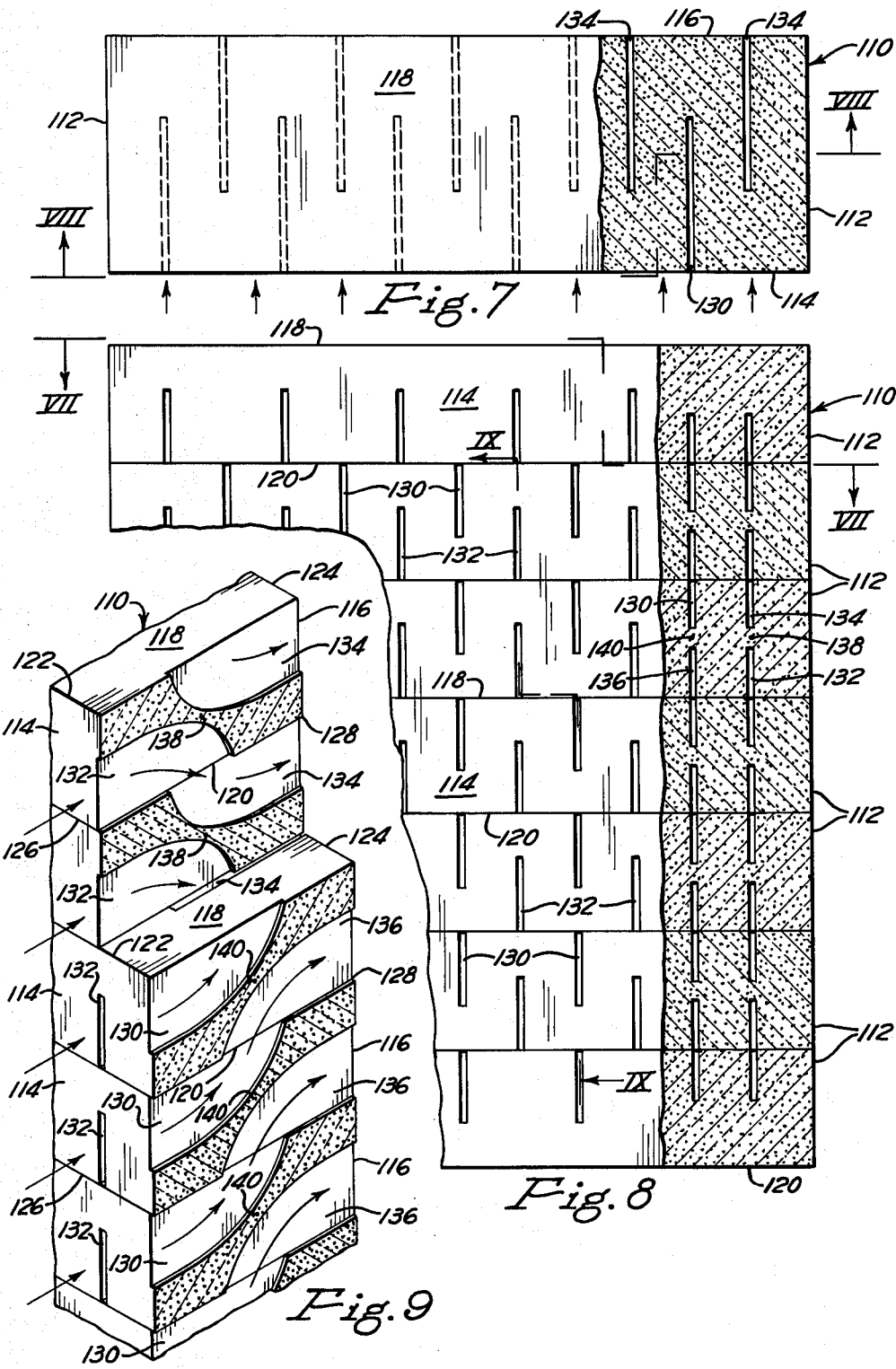

United States Patent Office 3,207,258
Patented Sept. 21, 1965

3,207,258
SOUND ABSORBING SYSTEMS
Dominic D'Eustachio, Pittsburgh, Pa., assignor to Pittsburgh Corning Corporation, Port Allegany, Pa., a corporation of Pennsylvania
Filed Mar. 17, 1964, Ser. No. 352,497
34 Claims. (Cl. 181—33)

This application is a continuation-in-part of my copending application Serial Number 836,158, filed August 26, 1959, entitled, "Sound Systems," now abandoned.

This invention relates to acoustic systems and more particularly to such systems which are adapted to absorb acoustical energy accompanying the flow of a fluid medium within a confined space.

Heretofore, difficulties have been encountered in absorbing sound energy which accompanies the flow of a fluid such as air within a ventilating duct, wind tunnel, room, or other confined space. These difficulties have been of special moment in situations where it is desirable to provide effective sound attenuation without unnecessarily reducing or restricting the flow of such fluid. In many previous systems that have been employed for this purpose, it often has been necessary to line the walls of the space with acoustic material of considerable overall dimensions in order to achieve the desired result, and this has impaired the effective use of the sound absorptive material in many instances. Additionally, in some systems heretofore employed the space walls have been lined with acoustic material having uneven or irregular surfaces thereon and this has restricted the flow of air and other fluid and has complicated the effective installation of the material.

In other systems, conventional acoustic filters have been employed to attenuate the sound energy that accompanies flow of a fluid such as air. Conventional, presently known acoustic filters are elongated tubes or ducts that depend on the attenuation of sound energy by either a sound absorbing material lining the tube or duct or on baffles within the tube or duct that dissipate to a limited extent the sound energy by reflection of the pressure waves. Some acoustic filters utilize both a lining of sound absorbing material and the baffles to attenuate the sound energy. Generally, to be effective, presently known acoustic filters have a length equal to or greater than one-half a wave length of the sound waves for which the filter is designed to be effective. The size, especially the length, of conventional acoustic filters is one of the critical limitations in their use for absorbing sound energy in a confined space.

One general object of this invention, therefore, is to provide an improved acoustic system which is particularly adapted to absorb acoustical energy accompanying the flow of fluid within a confined space.

More specifically, it is an object of this invention to provide such a system which enables extremely effective sound attenuation without unduly restricting the flow of fluid in a confined space.

Another object of this invention is to provide an improved absorber system of the character indicated which may be effectively installed in a relatively small space.

A further object of this invention is to provide a sound attenuating device that is thin in comparison with presently known acoustic filters and which effectively impedes the transmission of sound therethrough.

Still another object of this invention is to provide an acoustic absorber or filter of comparatively simple construction which is economical to manufacture and thoroughly reliable in installation.

In one illustrative embodiment of this invention there is provided a sound absorbing system comprising a first and second slab of open celled cellular material which is maintained in spaced apart relationship with each other on opposite sides of the path of a fluid medium flowing longitudinally through a confined space. Each of the slabs includes a plurality of recesses such as slots, for example, which extend into opposite principal faces thereof and are so spaced that, as a result of the open celled characteristics of the slab of material, a degree of intercommunication exists between a given recess and the recesses thereadjacent.

In another illustrative embodiment of this invention there is provided an acoustic filter comprising a relatively thin slab of open celled material having a plurality of recesses or slots extending therethrough. The acoustic filter comprising the slab of open celled cellular material is arranged to be positioned in a duct or tube in the path of and substantially normal to the direction of flow of the fluid medium. The slots or recesses are so arranged in the acoustic filter to minimize the flow resistance of the filter to the fluid medium passing therethrough and yet effectively impede the transmission of sound through the acoustic filter. The slots or recesses are so spaced in the acoustic filter that a degree of intercommunication exists between adjacent recesses through the open celled cellular material and the relatively thin walls between the slots or recesses further attenuate the sound energy accompanying the fluid medium. The acoustic filter of this invention is also effective in attenuating sound energy created by a source without the accompanying flow of a fluid medium.

In accordance with one feature of this invention, the recesses in the principal face of each slab positioned on opposite sides of the path of a fluid medium flowing therebetween are of varying depth and the relative depth of each recess is carefully controlled in accordance with a predetermined pattern to insure optimum acoustic attenuation. The pattern of the recesses produces a pattern of acoustic impedance which varies along the length of the confined space and this has highly advantageous results. More specifically, in accordance with this feature of the invention, the inner ends of the recesses in each slab are disposed along substantially zigzag paths. The pattern of the recesses is such that the zigzag paths are repeated at measured intervals so that the installation is, in effect, tuned to a particular portion of the audio frequency spectrum or to a series of portions thereof, thereby providing extremely effective acoustic absorption for the most prevalent sound frequencies while also providing good absorption for other sound frequencies therein. Thus, in one important embodiment, points where there is an abrupt change in the depth of the recesses and hence an abrupt change in the acoustic impedance are spaced apart one-half wave length of sound waves for which the system is designed to be particularly effective.

In accordance with another feature of this invention, in some embodiments recesses extending into each slab from opposite principal faces thereof are interleaved, and each recess is in sufficient proximity with its neighboring ones so that fluid motion or pressure created by the sound waves within one recess has an effect on the fluid in the adjacent recesses. The spacing of the recesses, together with the open celled characteristics of the slab material, provides high damping of the motion of the fluid in and out of these recesses thereby further enhancing the sound absorptive qualities of the system.

In accordance with a further feature of the invention, the acoustic filter comprises a plurality of rectangular blocks of open celled cellular material which are mounted in overlying stacked relation with each other. Each of the blocks has a plurality of recesses therein which extend into opposite principal faces and terminate within each block. The rectangular blocks are so positioned in overlying relation with each other and the plurality of recesses are so formed in the blocks that the recesses of adjacent blocks interconnect to form sinuous passageways through the acoustic filter for the flow of fluid medium therethrough. The passageways are formed in the open celled cellular material so that the walls of the passageways effectively absorb the sound energy. The passageways are so spaced from each other that a degree of intercommunication exists through the open celled material between adjacent passageways for further sound attenuation.

In accordance with a still further feature of this invention, certain of the faces of the various sections of the slabs are uniformly disposed in a substantially flat parallel plane and are of a configuration such that the system may be quickly and easily installed in a minimum space without unduly affecting the flow of air or other fluid medium therethrough.

The present invention, as well as further objects and features thereof, will be understood more clearly and fully from the following detailed description of certain preferred embodiments thereof when read in conjunction with the accompanying drawings, in which:

FIGURE 1 is a partial, perspective view of an acoustic system constructed in accordance with one illustrative embodiment of the invention.

FIGURE 2 is a side view of a sound absorber block useful in connection with the invention.

FIGURE 2a is a side view, similar to FIGURE 2 but on a reduced scale, of another sound absorber block useful in connection with the invention.

FIGURE 3 is a sectional view taken along the lines 3—3 in FIGURE 2.

FIGURE 7 is a top plan view partially in section taken along the line 7—7 in FIGURE 8 of an acoustic filter constructed in accordance with another illustrative embodiment of this invention.

FIGURE 8 is a view in elevation and partly in section taken along the line 8—8 in FIGURE 7.

FIGURE 9 is a partial perspective view of the acoustic filter illustrated in FIGURE 7 taken along the line 9—9 of FIGURE 8 and illustrating the sinuous passageways formed in the acoustic filter.

Figure 10:
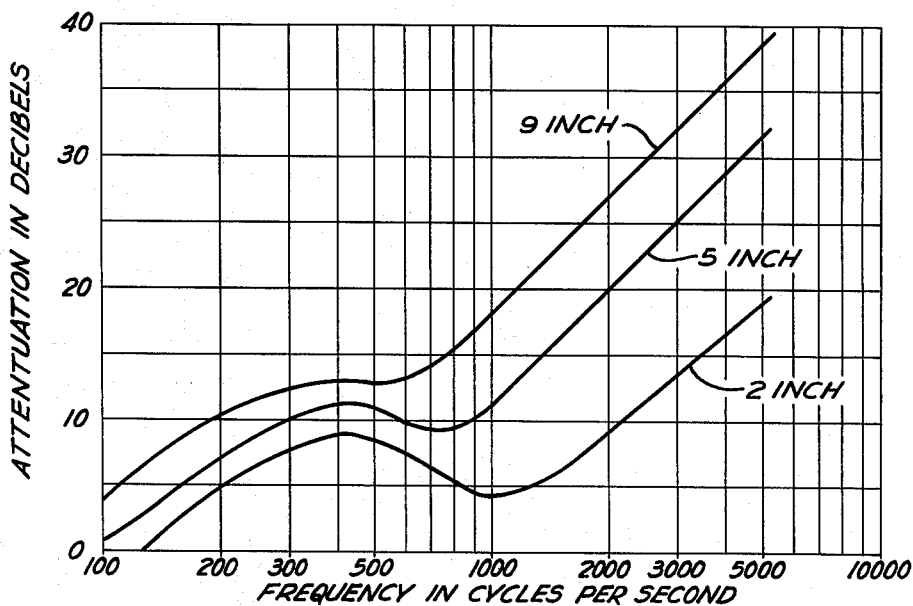
Figure 11:
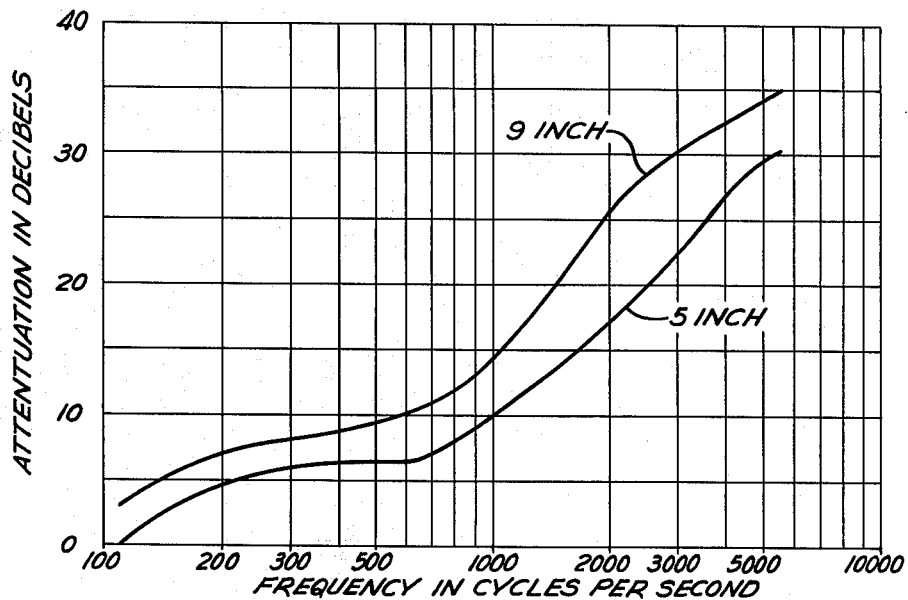

FIGURES 10 and 11 are graphical representations of the sound attenuation of various acoustic filters constructed in accordance with the invention illustrated in FIGURES 7–9. FIGURE 10 graphically represents the sound attenuation at various frequencies where the recesses in the overlying blocks have a one and one-half inch overlap and form the sinuous passageways. FIGURE 11 is a graphical representation similar to FIGURE 10 where the recesses of overlying blocks have a three inch overlap.

The acoustic absorbers or filters of the present invention may be fabricated from various types of sound absorptive material. For many applications the absorbers are formed advantageously from slabs of cellular glass which have been treated so as to provide a degree of communication between the various cells. In one illustrative method of producing acoustic material of this type, a slab or block of cellular glass having closed abutting cells is inserted in a chamber, and after the chamber is closed increasing gaseous pressure is applied to the interior of the chamber so as to progressively break passages from cell to cell throughout the material without otherwise breaking down the structure, as more fully described in my Patent No. 3,087,576, and the patents and applications referred to therein. The slabs are then further treated as described herein so as to form extremely effective sound absorbers.

In the broadest aspects of the present invention, however, the slabs may be formed from any suitable type of sound absorptive material having intercommunicating pores and having sufficient dimensional stability so that recesses or cavities formed therein, in a manner to be described hereafter, accurately retain their shape under the various physical conditions to which the material is exposed.

Referring initially to FIGURE 1 of the drawings, there is shown an acoustic filter 10 which is adapted to be interposed in an air duct or other confined space where there is sound which it is desirable to absorb. The direction of flow of the sound energy is indicated schematically by an arrow 11. In some situations, the air in the duct travels in the same direction as the sound energy, such as might occur in certain air conditioning systems or in systems utilizing an intake fan, for example, at one end of the duct. However, in the systems illustrated in the drawings, it may be assumed that the sound energy is traveling in a direction opposite to that of the air, as might occur in the use of an exhaust fan (not shown) or like device to draw the air through the duct. Thus, while the direction of the arrow 11 indicates sound transmission from right to left, as viewed in FIGURE 1, the air passing through the filter 10 travels from left to right.

The acoustic filter 10 comprises, in an illustrative embodiment, two slabs 12 and 13 of open-celled, cellular glass. The slabs 12 and 13 are positioned in spaced-apart, substantially parallel relationship with each other and are each rigidly affixed along one longitudinal edge to a lower plate 14, which may or may not be fabricated from acoustic material. The opposite longitudinal edges of the slabs 12 and 13 are adapted to be secured to an upper plate (not shown). In some embodiments the slabs 12 and 13 may be positioned so that they line opposite walls of the duct. Hence the region lying between the slabs is, in effect, the duct through which air passes.

The slab 12 comprises a plurality of acoustic sections 15, 16, 17 and 18 which are disposed in aligned, end to end relationship with each other and are secured together by means of a suitable adhesive (not shown). Similarly, the slab 13 is composed of a series of sections 19, 20, 21 and 22 which are likewise adhesively affixed to each other in end to end registry. Any suitable type of adhesive, such as neoprene cement, for example, may be employed for the purpose of maintaining the various slab sections in position.

The sections 15, 16, 17 and 18 of the slab 12 and the sections 19, 20, 21 and 22 of the slab 13 each comprise a plurality of elongated acoustic blocks 23 (FIGURE 2) which are disposed in stacked relationship with each other in each slab section and are adhesively secured together in a manner similar to that outlined above. Each of the blocks 23 is of identical construction and includes a pair of oppositely disposed, parallel surfaces 24 and 25 thereon which extend in a longitudinal direction in planes parallel to the direction of fluid flow through the filter 10. As best shown in FIGURE 3, the surface 24 of each block is partially defined by a pair of longitudinal block corners 26 and 27, while surface 25 is similarly defined by longitudinal block corners 28 and 29.

Each of the blocks 23 includes a plurality of recesses, such as the transverse slots 30, 31, 32 and 33, which extend inwardly from respective block corners 26, 27, 28 and 29 in parallel planes. The slots 30 and 31 are alternately and equally spaced along the surface 24 and are separated from each other along this surface by a distance $a$ (FIGURE 2). Slots 32 and 33 are disposed in the surface 25 and are similarly alternately and equally spaced thereon. The slots 32 are located in the planes of the slots 31, and slots 31 and 32 extend from the opposite, diagonal corners 27 and 28, respectively, of the block cross-section, as best shown in FIGURE 3. In a similar manner, the slots 33 are located in the planes of the slots 30, and slots 30 and 33 respectively extend from the opposite, diagonal corners 26 and 29 of the block 23.

For purposes that will become apparent hereafter, the depth of each of the slots 30, 31, 32 and 33 is carefully controlled in accordance with certain predetermined rules. The depth of the slots 30 and 31 extending into block 23 from the surface 24 adjacent the left end of the block, as viewed in FIGURE 2, is relatively great, while that of the slots 30 and 31 disposed toward the right along surface 24 becomes progressively and uniformly smaller. Thus, the transverse distance $b$ at the left end of the block 23, which is representative of the depth of slots 30 and 31 adjacent this left end, is considerably greater than the transverse distance $c$ at the right end of the block, representing the depth of the slots 30 and 31 adjacent this right block end. On the other hand, the depth of the slots 32 and 33 extending into the block 23 from the opposite surface 25 adjacent the left end of the block is relatively small, while the depth of slots 32 and 33 disposed toward the right along surface 25 becomes progressively and uniformly greater. The depth of slots 32 and 33 adjacent the left end of the block is represented by the distance $c$ at this left end, while that of these slots adjacent the right end of block 23 is represented by the relatively larger distance $b$ at the right end of the block. In FIGURE 2, the sum of the distances $b$ and $c$ at each end of block 23 is slightly greater than the block width.

The slots 30 and 31 in the surface 24 are interleaved with the slots 32 and 33 in the surface 25. That is, the inner ends of the slots 30 and 31 overlap the inner ends of the slots 32 and 33. It is preferable that the slots 30 and 31 do not meet the slots 32 and 33. However, the adjacent slots 30, 31, 32 and 33 are in sufficient proximity so that a degree of communication exists therebetween as a result of the open-celled characteristics of the block material, for purposes that will appear hereafter.

In the embodiments of the invention illustrated in the drawings, the slots 30, 31, 32 and 33 preferably are cut in the acoustic blocks 23 before these blocks are assembled into the various sections forming slabs 12 and 13. Any suitable means, such as a circular saw, for example, may be employed to form the slots. The inner end of each of the slots 30, 31, 32 and 33 advantageously is disposed along an arcuate path which is free from any abrupt edges or corners. The volume of each slot is large when compared to the volume of a typical cell in the acoustic material forming the blocks 23, although the width of the slots is considerably smaller than the wavelengths of the acoustic energy which the filter is principally designed to absorb.

As an illustration, in one satisfactory acoustic filter fabricated from open-celled material having an average cell diameter of approximately one millimeter, each of the slots 30, 31, 32 and 33 in the various blocks 23 is three millimeters wide. The distances $a$ in FIGURE 2 are each ¾ of an inch, and the slots 30 and 31 in surface 24 of each block overlap the slots 32 and 33 in the surface 25 by approximately one inch. In this illustration, each block 23 is 24 inches long, 9 inches wide and 4 inches thick. For blocks of these dimensions, the distances $c$ are 2½ inches. These dimensions are, of course, purely illustrative.

As indicated heretofore, the blocks 23 in each of the sections 15, 16, 17 and 18 forming slab 12 and in each of the sections 19, 20, 21 and 22 forming slab 13 are adhesively affixed in stacked relationship with each other. The blocks in each section are arranged with the surfaces 24 exposed on one side of the stack and the surfaces 25 exposed on the other side of the stack. When assembled to form the filter 10 (FIGURE 1), the blocks 23 in slab sections 15 and 16 are positioned with the surfaces 25 thereof facing inwardly in contact with the air flowing through the filter, while the surfaces 24 of these blocks face outwardly on the opposite sides of sections 15 and 16. The blocks in slab sections 17 and 18, on the other hand, are disposed with the surfaces 24 facing inwardly and the surfaces 25 facing in an outward direction. These sections 15, 16, 17 and 18 are longitudinally and adhesively aligned in abutting relationship with each other to form the slab 12. The inwardly directed block surfaces 24 and 25 thereof are in coplanar alignment with each other to form an inner principal face 34 of slab 12, while the outwardly directed block surfaces 24 and 25 are likewise aligned to form an outer principal face 35 of this slab.

In a similar manner, the blocks 23 in sections 19 and 20 of slab 13 are disposed with the surfaces 25 thereof facing in an inward direction in contact with the air flowing through the filter 10, while surfaces 24 of these blocks face outwardly on the opposite sides of sections 19 and 20. The blocks in slab sections 21 and 22, on the other hand, are inverted and are positioned with the surfaces 24 thereon facing inwardly and the surfaces 25 facing in an outward direction. The inwardly directed block surfaces 24 and 25 of sections 19, 20, 21 and 22 are in coplanar alignment with each other to form an inner principal face 36 of the slab 13, while the outwardly directed surfaces 24 and 25 of the blocks in these sections are likewise aligned to form an outer principal face 37 of slab 13.

When the blocks 23 in the various slab sections are arranged in the manner described above, the inner ends of the slots 30, 31, 32 and 33 in each slab 12 and 13 form a longitudinally extending, substantially zigzag pattern. For example, the depth of the slots 32 and 33 in the inner surfaces 25 of the blocks in section 16 (only the slots 33 being visible in FIGURE 1) is relatively small adjacent the left end of this section, while the depth of the slots 32 and 33 disposed toward the right along surfaces 25 of section 16 becomes progressively and uniformly greater. The depth of the slots 30 and 31 in the inner surfaces 24 of the blocks in section 17, on the other hand, is relatively large for the slots at the end of this section adjacent the right end of section 16 but becomes progressively smaller for the slots approaching the opposite end of section 17. The interleaved, inner ends of the slots 30 and 31 extending into the blocks 23 in section 16 from the outer surfaces 24 and of the slots 32 and 33 extending into the blocks in section 17 from the outer surfaces 25 likewise follow this zigzag pattern.

In a similar manner, the inner, interleaved ends of the various slots 30, 31, 32 and 33 in the blocks 23 in sections 20 and 21 of slab 13 form a substantially zigzag pattern. Thus, for example, the slots 32 and 33 adjacent the left ends of the blocks in section 20 and the slots 30 and 31 adjacent the right ends of the blocks in section 21 are relatively shallow. On the other hand, slots 32 and 33 at the right ends of the blocks in section 20 and slots 30 and 31 at the left, abutting ends of the blocks in section 21 are relatively deep.

The zigzag pattern formed by the inner ends of the slots in sections 16 and 17 of slab 12 and in sections 20 and 21 of slab 13 is repeated and reversed throughout the length of the slabs for each pair of slab sections. Thus, for example, the depth of the slots 30 and 31 in the inner surfaces 24 of the blocks in section 18 of slab 12 is relatively great adjacent the left end of this section, as viewed in FIGURE 1, while the slots disposed toward the right end of section 18 become increasingly smaller. Should a slab 12 of greater length be desired, an additional section (not shown) may be positioned in alignment with the right end of section 18. In this additional section, the slots extending into the blocks from the inner surfaces thereof at the left end of the additional section would be relatively shallow while these slots adjacent the right end of the additional section would be relatively deep.

At each repetition of the zigzag pattern of the slots 30, 31, 32 and 33 in the slabs 12 and 13, there exists an abrupt change in the depth of the slots. Thus, for example, the depth of the slots 32 and 33 extending into the inner principal face 34 of slab 12 at the right end of section 15 is relatively great, while that of the immediately adjacent slots 32 and 33 in face 34 at the left end of section 16 is relatively small. Other abrupt changes in the slot depth occur at the adjacent ends of sections 17 and 18 in slab 12, at the adjacent ends of sections 19 and 20 in slab 13 and at the adjacent ends of sections 21 and 22 in slab 13. At these positions, indicated by the letter X in FIGURE 1, where abrupt changes in slot depth occur, there occurs abrupt changes in the acoustic impedance of the filter 10. Note that at intermediate positions, such as that designated as Y, the change in slot depth and in acoustic impedance is more gradual than at positions X.

The slots 30, 31, 32 and 33 are formed in each of the acoustic blocks 23 of FIGURES 1–3 through the use of a gang circular saw having a plurality of blades of equal diameter. In order to provide the above-described slot pattern in the various block surfaces, the longitudinal direction of each block into which the slots are cut is disposed at a small angle with respect to the axis of the saw blades, and the depths of the resulting slots thereby vary uniformly and continuously along the block length. As a result of this method of construction, each of the slots extends in a plane which meets the corresponding block surface at an angle that is slightly greater, or less, than ninety degrees. When the blocks 23 are assembled into sections to form the slabs 12 and 13, the slots 30, 31, 32 and 33 in respective sections immediately adjacent each of the abrupt changes in slot depth (points X) are disposed in substantially parallel planes. The planes of the slots in adjacent slab sections 15 and 16 of slab 12 and in adjacent slab sections 19 and 20 of slab 13 meet the respective inner principal faces 34 and 36 at angles that are slightly less than ninety degrees, when measured with respect to the direction of flow of the sound energy in filter 10, while the planes of the slots in adjacent slab sections 17 and 18 of slab 12 and in adjacent slab sections 21 and 22 of slab 13 meet the principal faces 34 and 36, respectively, at angles that are slightly greater than ninety degrees, when measured in this direction. The slots in respective adjacent sections which do not include an abrupt change in slot depth are disposed in planes which meet at an angle with each other.

In other good arrangements, the slots in the acoustic slabs are formed by a gang circular saw having each blade somewhat larger in diameter than the preceding blade. In this latter situation, the longitudinal direction of each block into which the slots are cut is positioned in substantially parallel relationship with the axis of the saw blades. As a result, when the blocks are assembled to form slabs, the slots in each slab extend in planes which are disposed at right angles to the slab principal faces, and the blocks are arranged so that the depth of the slots conforms to the desired slot pattern.

The embodiment of the invention described above provides an extremely effective reduction in the noise level incident to the flow of air or other fluid between the inner principal faces 34 and 36 of the slabs 12 and 13, respectively. The sound energy moving down the filter 10 between these principal faces in the direction of the arrow 11 consists for the most part of fluctuations in air pressure. As a result of these pressure fluctuations, air moves in and out of the slots 30, 31, 32 and 33. The relatively small width of each of these slots provides a narrow passage for the air as it enters the neck portion of the slot adjacent the corresponding principal face. These narrow passages offer a high resistance to the flow of air therethrough, and thereby provide an effective reduction of sound energy.

Additionally, as the air moves in and out of slots having a natural frequency equal to a particular pressure fluctuation frequency, there exists a resonance phenomena that greatly increases the amount of air flowing in and out of the slots. Thus, the mass of air moving in and out of each slot comprises an inductance which, when coupled with the acoustic capacity of the slot, forms a tuned circuit. Upon resonance, the amplitude of the air motion in the slot increases to a value greater than that normally existing in the duct as a result of the sound energy moving down the filter 10. The resistance to the flow of air through the slots resulting from the narrow passages formed thereby (as well as the resistance to air flow resulting from the open-celled characteristics of the material adjacent the slots) introduces damping into the resonant circuit and, as a result of the effect of this dampening on the increased quantities of air flowing through the slots, effective sound attenuation is achieved.

The natural frequency of a given slot depends in part upon the acoustic capacitance thereof, and this capacitance is largely determined by the total volume of the slot. Thus, by providing slots of varying depth, each with a relatively small width to form the narrow air passage, the natural frequency of the slots is varied from slot to slot to thereby create resonance over a band of sound frequencies in the filter 10. By designing each slot so that it has a natural frequency equal to a prevalent frequency of the sound which the filter is particularly adapted to absorb, effective sound attenuation is achieved over substantially the entire frequency range of the sound therein.

As the air between the inner principal faces 34 and 36 of the filter 10 flows into the inner ends of each of the slots 30, 31, 32 and 33, the zigzag pattern followed by these inner ends assists greatly in providing effective acoustic attenuation. In the embodiment of the invention illustrated in FIGURES 1–3, the zigzag pattern is repeated and reversed every half wavelength for those sound frequencies, in the given installation, for which the absorber is principally designed. Thus, the distance (measured longitudinally of the filter 10) between the abrupt changes in slot depth (points X) is substantially equal to one-half the wavelength of these frequencies. This is true for both slab 12 and slab 13. These points X in slab 12 are positioned opposite corresponding points X in slab 13. This periodic repetition of the slot pattern and of the acoustic impedance values creates an impedance mismatch at the points X which results in a very high overall absorption of sound energy.

As indicated heretofore, in certain particularly advantageous embodiments the slots 30, 31, 32 and 33 extending into the slabs 12 and 13 from respective inner principal faces 34 and 36 thereof are interleaved with the slots 30, 31, 32 and 33 extending into slabs 12 and 13 from respective outer principal faces 35 and 37. The pressure fluctuations created by the sound waves in the slots in inner principal faces 34 and 36 cause similar fluctuations in a surrounding zone of the open-celled block material, and these fluctuations in turn affect the action of the air in the interleaved slots extending from the outer principal faces 35 and 37. As a result, the resistance to the movement of air in and out of the slots is increased, and the degree of acoustic absorption is further improved. This slot arrangement also broadens the band of frequencies for which the acoustic filter 10 is particularly effective.

In certain other good embodiments of the invention, the slots in a particular slab extend into only one of the principal faces thereof. Slabs of this latter configuration are composed of acoustic blocks, such as block 23a of FIGURE 2a, which are likewise fabricated from open-celled, cellular material. The block 23a includes oppositely disposed, longitudinal block surfaces 24a and 25a thereon which extend in substantially parallel planes. Positioned in the longitudinal block edges adjacent the surface 25a are a plurality of slots 32a and 33a respectively. The slots 32a and 33a extend in parallel planes into the surface 25a at uniformly and continuously varying depths in a manner similar to that described heretofore in connection with the slots 32 and 33 of block 23. Thus, the slots 32a and 33a extending into the surface 25a adjacent the left end of block 23a, as viewed in FIGURE 2a, are relatively shallow, while those disposed toward the right along surface 25a become progressively deeper.

The blocks 23a are assembled into an acoustic slab in a manner similar to that described above in connection with the slabs 12 or 13 of FIGURE 1, but with all of the block surfaces 25a disposed in a single plane to form one of the slab principal faces. The blocks are arranged so that the inner ends of the slots 32a and 33a extending into this principal face are disposed in a zigzag pattern which is repeated and reversed throughout the slab length to form abrupt changes in the slot depth. The spacing between these abrupt changes is similar to that between the points X in FIGURE 1.

Slabs constructed from the blocks 23a are of particular utility when the slab is employed to provide an acoustic lining for a relatively rigid surface, such as the inside of some air ducts or the walls of a room, for example. The principal face formed from the block surfaces 24a is adhesively or otherwise affixed to the surface to be lined, and the opposite principal face having the slots 32a and 33a is disposed adjacent the sound energy. In other situations, slabs comprising the blocks 23a are oppositely disposed in an air filter in a manner similar to the slabs 12 and 13 of FIGURE 1.

Figure 4:
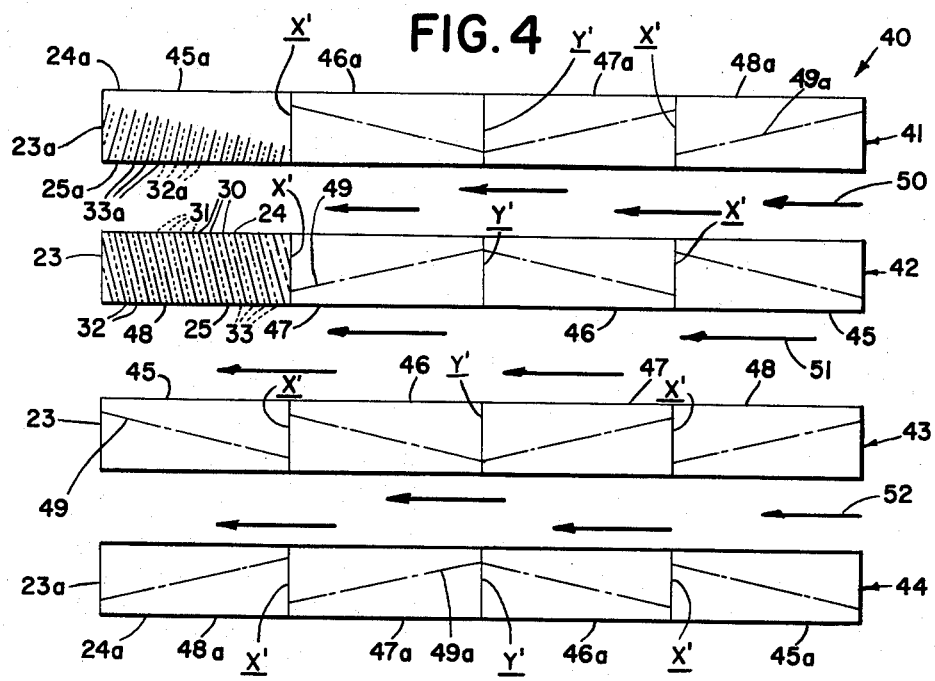
FIGURE 4 is a plan view of an acoustic system constructed in accordance with another illustrative embodiment of the invention, with portions thereof removed for purposes of clarity.

In FIGURE 4 there is shown a partial, plan view of an acoustic filter 40 which is representative of another, illustrative embodiment of the invention. The filter 40 includes a series of slabs 41, 42, 43 and 44 of open-celled material which are disposed in spaced, substantially parallel relationship with each other and are mounted between suitable plates (not shown) interposed in an air duct or other enclosure. The innermost slabs 42 and 43 each comprise four sections 45, 46, 47 and 48 which are assembled from the acoustic blocks 23 in a manner similar to that described heretofore in connection with the description of the block sections disclosed in FIGURE 1. Although for purposes of convenience only one of the blocks 23 of slabs 42 and 43 has been shown in detail in FIGURE 4, it will be understood that each of these blocks is of identical construction and includes the slots 30 and 31 extending inwardly from the longitudinal surface 24 and the slots 32 and 33 which are interleaved with slots 30 and 31 and are disposed in the opposite longitudinal surface 25. The outermost slabs 41 and 44 each comprise four sections 45a, 46a, 47a and 48a which are assembled from the acoustic blocks 23a (FIGURE 2a). Again, although only one of the blocks 23a of slabs 41 and 44 has been shown in detail in FIGURE 4, each of these blocks is of identical construction and includes the slots 32a and 33a which extend inwardly from the inner longitudinal surfaces 25a. The opposite surfaces 24a of the blocks in slabs 41 and 44 are disposed on the outside of the filter 40.

The zigzag patterns formed by the inner, interleaved ends of the slots 30, 31, 32 and 33 in the innermost slabs 42 and 43 are illustrated schematically in FIGURE 4 by center lines 49 and are substantially the same as the patterns formed by the slots in slabs 12 and 13 of FIGURE 1. Thus, the sections 45, 46, 47 and 48 of the slab 43 of FIGURE 4 are substantially the same as respective sections 15, 16, 17 and 18 of the slab 12 in FIGURE 1. Similarly, sections 48, 47, 46 and 45 of the slab 42 correspond to FIGURE 1 slab sections 19, 20, 21 and 22, respectively.

The zigzag patterns formed by the inner ends of the slots 32a and 33a in the outermost slabs 41 and 44 are shown schematically by center lines 49a and are reversed with respect to the patterns in slabs 42 and 43, respectively. For example, as viewed in FIGURE 4, the depth of the slots in the inner surfaces 24a of the blocks forming slab 41 at the left end of section 45a thereof is relatively large. The slots extending toward the right end of section 45a become progressively more shallow until the left end of section 46a of slab 41 is reached. The depth of the slots at this point (point X') abruptly changes, and they again become relatively deep and gradually and uniformly decrease in depth, the slots in the block surfaces 25a adjacent the right end of section 46a (point Y') being relatively shallow. The slots projecting from surfaces 25a at the adjacent, abutting end of section 47a of slab 41 are likewise shallow. The depth of the slots increases as they approach the right end of section 47a, at which point they again undergo an abrupt change and become relatively shallow at the left end of section 48a. These slots in section 48a of slab 41 become progressively deeper as they approach the right end thereof. Thus, the zigzag pattern followed by the inner ends of the slots 32a and 33a in the outer slab 41 is reversed with respect to that followed by the slots 30, 31, 32 and 33 in the adjacent slab 42 and is similar to that followed by the slots in slab 43. Likewise, the pattern followed by the interleaved ends of the slots 32a and 33a in the outer slab 44 is reversed with respect to that of the slots 30, 31, 32 and 33 in its adjacent slab 43 and is substantially the same as that of the slots in slab 42.

The dimensions are arranged so that the distance from one point X', where an abrupt change in slot depth and hence impedance occurs, to the next one is one-half wavelength of the principal sound frequency to be absorbed.

Air, accompanied by sound, is adapted to flow from right to left through the filter 40 along three parallel paths. The direction of the sound energy flow between the slabs 41 and 42 has been shown by arrows 50, that of the sound energy flow between slabs 42 and 43 by arrows 51 and that of the sound energy flow between the slabs 43 and 44 by arrows 52. The sound accompanying the air flowing along these paths is attenuated by the slabs facing each path in a manner similar to that described heretofore. By providing a plurality of channels for the air flowing through the filter 40, the air handling capacity of the filter is enhanced, and the overall acoustic impedance is further increased.

Figure 5:
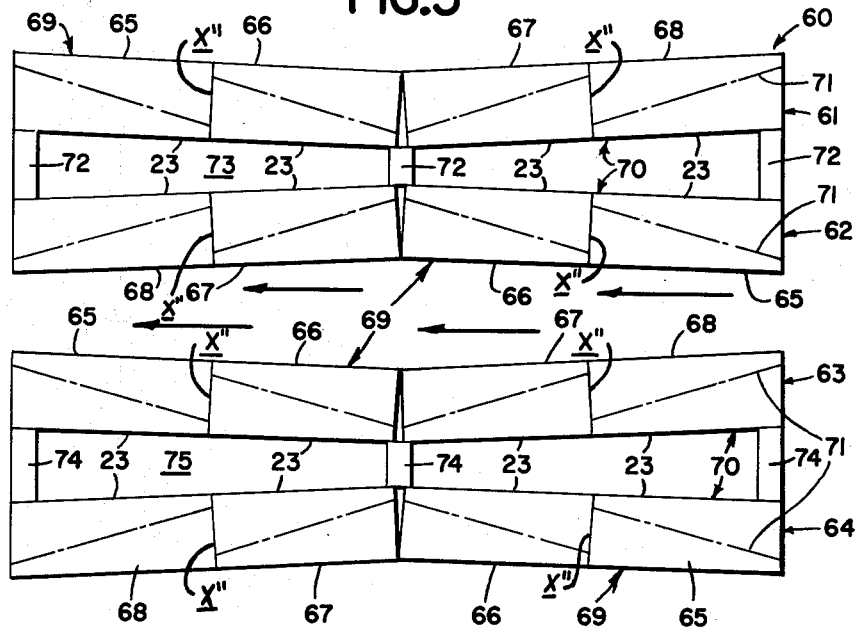
FIGURE 5 is a plan view of an acoustic system constructed in accordance with a third illustrative embodiment of the invention, with portions thereof removed for purposes of clarity.

In FIGURE 5 there is shown an air filter 60 constructed in accordance with another illustrative embodiment of the invention. The filter 60 includes spaced, longitudinal slabs 61, 62, 63 and 64 of open-celled acoustic material. Each of these slabs comprises four sections 65, 66, 67 and 68 which are assembled from the acoustic blocks 23 in a manner similar to that of the various sections of the slabs 12 and 13 in the FIGURE 1 embodiment of the invention. The surfaces 24 and 25 of the blocks 23 in each of the slabs 61, 62, 63 and 64 in FIGURE 5 form oppositely disposed, principal faces 69 and 70 on each slab. The patterns defined by the interleaved ends of the slots 30, 31, 32 and 33 in the principal faces 69 and 70 are indicated schematically by center lines 71 and are substantially the same as the patterns indicated by the center lines 49 and 49a in FIGURE 4 which have been described heretofore.

The acoustic slabs 61 and 62 are disposed on one side of the path of air or other fluid flowing through the acoustic filter 60 and are separated from each other by a plurality of spacers 72, thereby forming an enclosed air space 73 between these slabs. The centermost spacer 72 is somewhat shorter than the spacers 72 adjacent the ends of slabs 61 and 62 with the result that the air space 73 is restricted at its center. The sections 64 and 66 of slab 61 are in longitudinal, abutting alignment with each other and are positioned at a slight angle with respect to aligned, abutting sections 67 and 68 of this slab. Sections 65 and 66 of slab 62 likewise are in longitudinal, abutting alignment with each other and are disposed at a slight inverted angle with respect to aligned, abutting sections 67 and 68 of slab 62.

In a similar manner, the acoustic slabs 63 and 64 are positioned on the opposite side of the air path and are separated from each other by spacers 74, thereby forming an enclosed air space 75 between slabs 63 and 64. The center spacer 74 is shorter than the spacers 74 at the ends of these slabs, and the air space 75 is thereby restricted adjacent the central portion thereof. Sections 65 and 66 of slab 63 are longitudinally positioned in abutting alignment with each other and are disposed at a slight angle with respect to aligned, abutting sections 67 and 68 thereof. Similarly, the sections 65 and 66 of slab 64 are in longitudinal, abutting alignment with each other and are positioned at a slight, inverted angle with respect to aligned, abutting sections 67 and 68 of this slab.

As a result of the angular configuration of the slabs 61, 62, 63 and 64, the principal faces 69 and 70 of each of these slabs are angularly disposed with respect to the path of the air flowing through the filter 60. Thus, the inwardly directed faces 69 of inner slab 62 adjacent sections 65 and 66 and of inner slab 63 adjacent sections 67 and 68 are disposed in substantially flat planes which extend at diverging angles with respect to the direction of the air path. On the other hand, the faces 69 of slab 62 adjacent sections 67 and 68 and of slab 63 adjacent sections 65 and 66 are disposed substantially flat planes which extend at converging angles with respect to the direction of the air path. The opposite principal face 70 of slab 62, along with each of the principal faces 69 and 70 of the lower outer slab 64, angularly extend in substantially flat planes parallel to the planes formed by the principal face 69 of slab 62, while the opposite principal face 70 of slab 63, together with each of the principal faces 69 and 70 of the upper outer slab 61, are angularly disposed in substantially flat planes parallel to the planes of the principal face 69 of slab 63.

The slab construction described above provides an alternately widened and narrowed opening for the air flowing in the duct. Thus, in the FIGURE 5 embodiment, there is provided a widened opening for the air flowing through the filter 60 adjacent the central portion thereof and a relatively narrow opening at each end of this filter. The principal faces 69 and 70 of each of the slabs 61, 62, 63 and 64 are disposed along zigzag paths which tend to enhance the effect of the zigzag patterns, indicated schematically by the center lines 71, followed by the interleaved ends of the various slots extending into these faces. Thus, for example, the widened opening formed by the zigzag paths of the principal faces 69 of inner slabs 62 and 63 at the center portion of the filter 60 is located adjacent relatively deep slots extending into these faces, where the change of impedance is gradual, rather than abrupt. The relatively narrow openings formed by faces 69 of slabs 62 and 63 at each end of filter 60 are located adjacent relatively shallow slots in faces 69. In this manner, the improved acoustic attenuation provided by the zigzag slot pattern is accentuated by the zigzag arrangement of the slabs. The air spaces 73 and 75, together with the outer slabs 61 and 64, further modify the acoustic impedance of the filter 60 by providing an additional variable capacitance.

Figure 6:
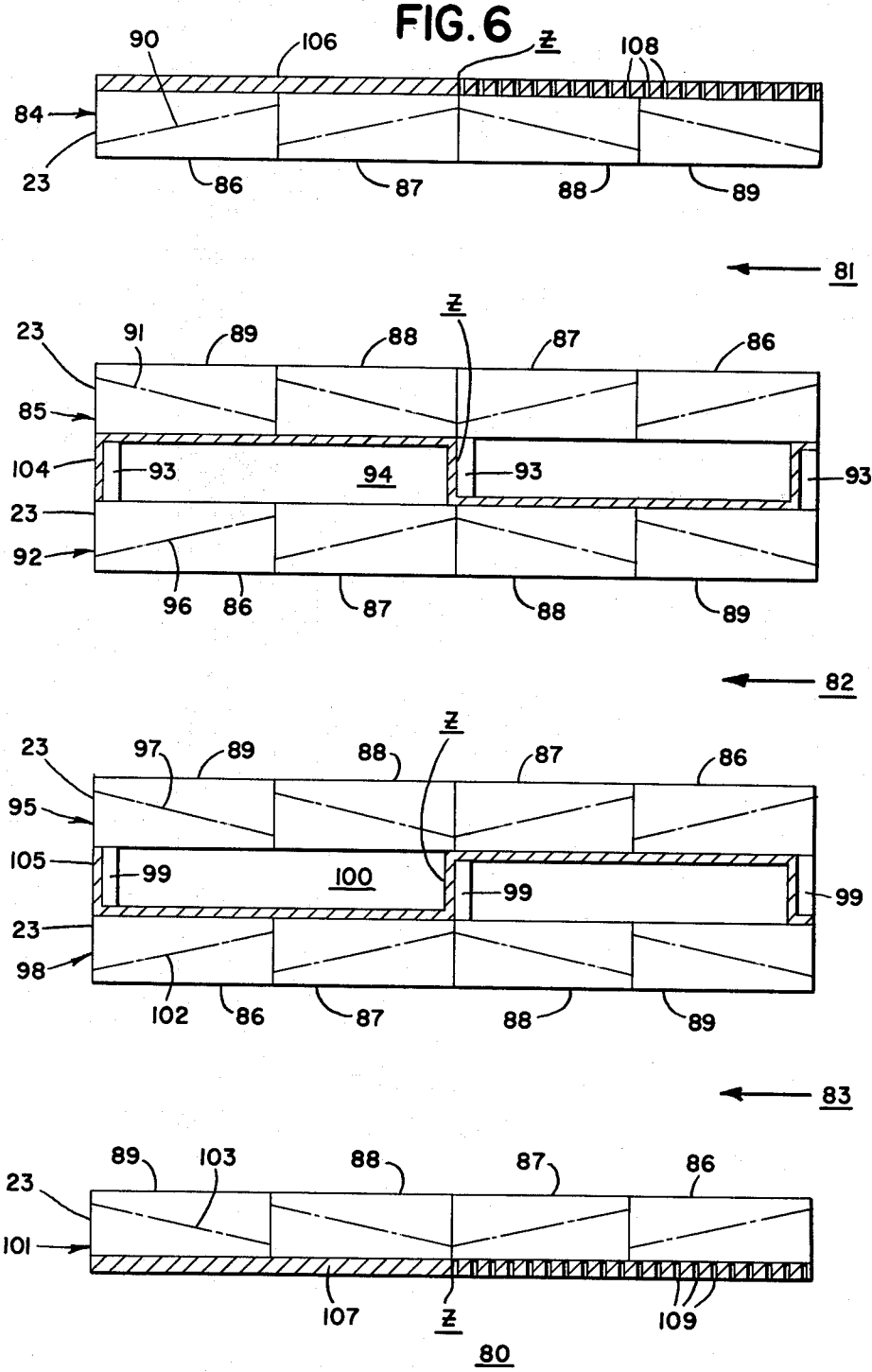
FIGURE 6 is a plan view of an acoustic system constructed in accordance with a fourth illustrative embodiment of the invention, with portions thereof removed for purposes of clarity.

In certain advantageous embodiments of the invention, a plurality of air paths are provided in an acoustic filter, and a pair of slabs are disposed between adjacent paths. Thus, as shown in FIGURE 6, there is provided an acoustic filter 80 having three parallel channels 81, 82 and 83, each of which is adapted to receive air, together with the accompanying sound, flowing through the filter. The channel 81 is disposed in the upper portion of the filter 80, as viewed in this figure, and is formed by two slabs 84 and 85. The slab 84 is disposed on one side of the channel 81 on the outside of the filter, while the slab 85 is located on the opposite side of channel 81 and extends in a plane parallel to that of slab 84. Each of the slabs 84 and 85 comprises four aligned sections 86, 87, 88 and 89 which are assembled from the blocks 23 in a manner similar to that described heretofore in connection with the description of the FIGURE 1 embodiment of the invention. The inner, interleaved ends of the slots in slab 84 are disposed along a zigzag path (indicated schematically in FIGURE 6 by a center line 90) similar to that of the slots of FIGURE 1 slab 13, while the interleaved ends of the slots in slab 85 follow a zigzag path similar to the path of the slots in FIGURE 1 slab 12, as shown in FIGURE 6 by a center line 91.

A slab 92 is maintained in spaced, parallel relationship with the slab 85 by three spacers 93, thereby forming an air space 94 between these slabs. The slab 92 forms one side of the center channel 82, while the other side of channel 82 is formed by a slab 95. Slabs 92 and 95 likewise are assembled from the blocks 23 in a manner described heretofore, and the inner ends of the slots in these slabs are disposed along patterns similar to those of the slots in slabs 13 and 12, respectively, of FIGURE 1. In FIGURE 6, the zigzag pattern of the interleaved portions of the slots in slab 92 is shown schematically by a center line 96, while that of the slots in slab 95 is illustrated by a center line 97.

Rigidly positioned in spaced, parallel relationship with the slab 95 is a slab 98. The slabs 95 and 98 are disposed between adjacent channels 82 and 83 and are separated from each other by three spacers 99, thus forming an air space 100 between these slabs. The slab 98 forms one side of the lower channel 83, while the opposite side of this channel is formed by a slab 101 disposed on the outside of the filter 80. Each of the slabs 98 and 101 likewise comprise four aligned sections 86, 87, 88 and 89 which are assembled from the acoustic blocks 23. As shown by a center line 102, the interleaved ends of the slots in slab 98 are disposed along a zigzag pattern similar to that of the slots of slab 13 in FIGURE 1, while the interleaved ends of the slots in slab 101 follow a pattern, illustrated by a center line 103, that is similar to the pattern of the slots in slab 12.

Sound accompanying the air flowing in the channels 81, 82 and 83 is attenuated by the slabs adjacent each channel in a manner similar to that described heretofore. By providing a plurality of channels in the filter 80 with a pair of spaced slabs between adjacent channels, the overall acoustic impedance of the filter is further increased, and extremely effective sound attenuation is achieved.

In some embodiments, it is advantageous to include sheets 104 and 105, of aluminum foil or the like, arranged as shown in the air spaces 94 and 100, respectively. The left portion of the sheet 104, as viewed in FIGURE 6, is secured to the left spacer 93 in space 94 and is adhesively affixed to the adjacent principal face of the slab 85. The center portion of sheet 104 is fastened to the center spacer 93, and sheet 104 extends along the adjacent principal face of slab 92, where its right end is secured to the right spacer 93. In a similar manner, the sheet 105 is secured in the air space 100 between slabs 95 and 98. The left end of sheet 105 is adhesively secured to the left spacer 99, and this sheet follows a path along the adjacent principal face of slab 98, across the air space 100 at the center spacer 99 and along the adjacent principal face of the slab 95 to the right spacer 99.

The outermost slabs 84 and 101 of the filter 80 are provided with sheets 106 and 107, respectively, which are each adhesively affixed to the respective slab and are fabricated from aluminum foil or similar material. The sheet 106 extends in a substantially flat plane and is secured to the outer principal face of the slab 84. The portion of sheet 106 affixed to the right pair of sections 88 and 89 of slab 84, as viewed in FIGURE 6, includes a plurality of apertures 108 in order to provide a series of air passages therein. The remaining portion of sheet 106 adjacent slab sections 86 and 87, on the other hand, is relatively impervious to the passage of air therethrough. In a similar manner, the sheet 107 is disposed in a flat plane and is affixed to the outer principal face of the lowermost slab 101. A plurality of apertures 109 extend through the portion of sheet 107 adjacent the right pair of sections 86 and 87 of slab 101, while the sheet portion adjacent the left pair of sections 88 and 89 is impervious to the passage of air.

As a result of the above construction, there occurs an impedance mismatch which greatly enhances the sound absorptive characteristics of the filter 80. The pressure fluctuations created by the sound in the channel 81, for example, adjacent the right portion thereof, as viewed in FIGURE 6, initiate the movement of air in and out of the interleaved slots of sections 88 and 89 of the outer slab 84 and in and out of the apertures 108 in sheet 106. These pressure fluctuations in the right portion of channel 81 likewise initiate the movement of air in and out of the interleaved slots in sections 86 and 87 of slab 85 and in and out of the air space 94. The acoustic impedance of filter 80 adjacent the left portion of channel 81, however, differs from that adjacent the right channel portion. Thus, air moves in and out of the slots in sections 86 and 87 of slab 84 but is blocked by the impervious portion of the sheet 106. Similarly, air movement occurs in the slots in sections 88 and 89 of slab 85, but the sheet 104 restricts this air movement in the air space 94.

The impedance of filter 80 adjacent the right portion of channel 82 likewise is different from that adjacent the left portion of this channel. Thus, the pressure fluctuations of the air adjacent sections 88 and 89 of slab 92 and adjacent sections 86 and 87 of slab 95 initiate air movement in and out of the slots in these sections, but this air movement is restricted by the right portions of sheets 104 and 105. The air movement adjacent the left hand sections 86 and 87 of slab 92 and adjacent the left hand sections 88 and 89 of slab 95, on the other hand, is transmitted through the slots in these sections to the air spaces 94 and 100.

The action of the air in the lower channel 83 is similar to that in the upper channel 81, and the acoustic impedance adjacent the right pairs of sections of the slabs 98 and 101 is thereby different than that adjacent the left pairs of sections of these slabs.

The impedance mismatch in each of the air channels 81, 82, and 83 further improves the overall sound absorptive qualities of the filter 80. As shown in FIGURE 6, the points where a change in impedance occurs as as a result of the sheets 104, 105, 106, and 107 (points Z) advantageously are disposed adjacent relatively gradual changes in the slot depth of the slabs, while the abrupt changes in slot depth are located remote from the points Z. In other good installations, the location of the points Z with respect to the abrupt changes in the depth of the slots may be adjusted to provide optimum acoustic attenuation for the particular band of frequencies that the installation is designed to absorb.

As noted above, the sheets 104, 105, 106, and 107 advantageously are made of aluminum foil or like material. In other good embodiments, however, these sheets may be fabricated from a relatively rigid material such as plywood.

In each of the embodiments of the invention illustrated in FIGURES 1–6, the various slots are provided in the blocks 23 or 23a, and these blocks are then assembled into sections to form the acoustic slabs. However, in certain other advantageous embodiments, holes or other type recesses may be substituted for the slots 30, 31, 32, and 33 in blocks 23 or for the slots 32a and 33a in blocks 23a. If desired, the recesses may be punched or otherwise located in a single piece of acoustic material forming each slab, or they may be inserted in the various blocks after they have been assembled to form the slabs. The spacing of the slots, holes, etc., in the slabs may be uniform or may vary from recess to recess to provide the desired acoustic effect. Similarly, the width of the slots, or the diameter of the holes, as the case may be, may vary throughout the principal faces of the slabs and may be tuned to a particular frequency or to one or more bands of frequencies.

The zigzag patterns followed by the inner ends of the recesses in the illustrated embodiments of the invention have many important advantages, some of which have been outlined above. However, in certain other embodiments, the recesses may describe other predetermined patterns. As an illustration, in one particularly good arrangement, the inner ends of the recesses in each of the slabs are disposed along substantially sinuous paths.

As indicated heretofore, in certain advantageous embodiments of the invention, the distance between the abrupt changes in depth of the various slots is equal to one-half the wavelength of the prevalent frequency in the audio-frequency range. In other advantages embodiments, these abrupt changes may be tuned to a particular band of sound frequencies, and the distance between the abrupt changes in each slab, together with the dimensions and arrangement of the slots, may vary and may be adapted in a given installation to absorb sound energy over substantially the entire audio-frequency range.

Should it become desirable to increase the air handling capacity beyond that which can be obtained by a single filter, such as the filters 10, 40, 60, or 80 shown in the drawings, a plurality of filters may be employed in parallel to provide a number of sound absorbing passages connected to the air duct. The filters may also be used in series, to obtain higher attenuation. In this latter arrangement, the various slabs of adjacent filters in series may be longitudinally aligned in abutting relationship with each other, or the slabs may be spaced apart to further vary the acoustic impedance pattern of the system.

FIGURES 7–9 illustrate another embodiment of the invention. An acoustic filter generally designated by the numeral 110 is adapted to be positioned in a duct or tube in the path of and substantially normal to the direction of flow of a fluid medium such as air or the like. It is intended that the acoustic filter be also positioned substantially normal to the direction of flow of the sound energy which is to be attenuated. It will be apparent that the flow of the fluid medium through the acoustic filter may be either in the same direction as the flow of sound energy or in a direction opposite to the flow of sound energy. Although not illustrated, it will be apparent that the acoustic filter 110 may be provided with a suitable frame or the like to suitably mount the filter with the duct or tube.

The acoustic filter 110 as illustrated in FIGURES 7–9 has a plurality of parallel passageways that extend through the slab from one face to the other. It should be understood in other embodiments holes or other types of passageways may be substituted for the passageways described.

As will be discussed later in greater detail, the acoustic filter, because it is relatively thin, should, for certain applications, be formed from a material that itself is not a transmitter of sound. For these applications the acoustic filter should have the properties of a limp wall and may be fabricated from blocks or slabs of open-celled composite material. The cells of composite material may be opened by any suitable means, such as the process described in U.S. Patent #3,087,576. An acoustic filter formed from blocks of the open-celled composite, when secured to each other by a suitable adhesive, has the properties of a limp wall and does not act as a transmitter of sound energy. The walls of the passageways formed in the composite material, however, retain the high sound absorptive properties of the open-celled cellular material previously described, and the walls between the adjacent passageways are so dimensioned that the acoustic resistance of the porous wall and the acoustic resistance of the passageway interact and provide an acoustic coupling between adjacent passageways.

The acoustic filter 110 comprises a plurality of rectangular blocks 112 that are positioned in stacked relation to each other and secured to each other by means of a suitable adhesive (not shown). The blocks 112 are of substantially the same construction and each has a pair of oppositely disposed vertical faces 114 and 116. For convenience the vertical face 114 will be designated the front vertical face, and the vertical face 116 as the rear vertical face. The faces 114 and 116 extend in a longitudinal direction in planes substantially perpendicular to the direction of flow of sound energy through the filter 110. The direction of flow of sound energy is diagrammatically illustrated by the plurality of arrows in FIGURES 7 and 9. The directional arrows in FIGURES 7 and 9 are also intended to designate the direction of flow of a fluid medium relative to the acoustic filter 110.

The rectangular blocks 112 have a pair of spaced horizontal parallel surfaces 118 and 120. Again, for convenience, the surface 118 will be designated the top surface of the block 112 and the surface 120 the bottom surface of block 112. The top surface 118 and the front vertical face 114 intersect to define an upper front corner 122. The rear vertical face 116 and top surface intersect to define an upper rear corner 124. The bottom horizontal surface 120 also intersects the vertical faces 114 and 116 to define a lower front corner 126 and a lower rear corner 128. The blocks 112 have a plurality of upper front recesses or recessed portions 130 formed therein which extend into both the front vertical face 114 and the top surface 118 a preselected distance, and are spaced from each other as is illustrated in FIGURE 8. Spaced between the upper front recesses 130 are a plurality of lower front vertical recesses or recessed portions 132 that extend into both the front face 114 and the bottom surface 120. The lower front recesses 132 terminate within the blocks 112 in a manner similar to upper front recesses 130.

The blocks 112 also have a plurality of upper rear vertical recesses or recessed portions 134 that extend into both the rear face 116 and the upper surface 118. The upper rear vertical recesses 134 are formed in the blocks 112 in substantially the same vertical plane as the lower front vertical recesses 132 and have a dividing wall 138 therebetween. The rear vertical surface 116 has a plurality of lower rear vertical recesses or recessed portions 136 formed therein which extend into both the rear vertical face 116 and the bottom surface 120. The lower vertical rear recesses 136 are formed in the blocks 112 in substantially the same vertical plane as the top recesses 130 and have a dividing wall 140 therebetween. The top block 112 may be formed without the top front recesses 130 or top vertical rear recesses 134 so that the top surface 118 of the top block 112 is planar and free of recessed portions. Similarly, in bottom block 112, the lower front recesses 132 and the lower rear recesses 136 may be omitted so that the bottom surface 120 of bottom block 112 is free of recessed portions.

The recessed portions 130, 132, 134, and 136 are formed in the blocks 112 in a preselected regularly spaced relation to each other so that when the blocks are positioned in overlying relation with each other the upper front recessed portions 130 are in the same plane as the lower rear recessed portions 136 of the block positioned thereabove to form a plurality of sinuous passageways through acoustic filter 110 as is clearly illustrated in the lower two blocks of FIGURE 9. The recessed portions are spaced in the blocks 112 so that the lower front recessed portions 132 of a block 112 are in the same vertical plane as the upper rear recessed portions 134 of the block positioned therebelow to form a plurality of other sinuous passageways in acoustic filter 110. With this arrangement, sinuous passageways are formed in the blocks 112 of acoustic filter 110 by the mating of the upper front recess portions 130 of one block 112 with the lower rear recess portions 136 of a block 112 positioned thereabove, and other sinuous passageways are formed by the mating of the lower front recess portions 132 with the upper rear recess portions 134 of a block 112 positioned therebelow. The pairs of mating recessed portions overlap a preselected amount to form the sinuous passageways through the acoustic filter 110.

The slots or passageways formed in the blocks 112 are spaced closely together to provide a complex acoustic impedance relationship of the passageways and the walls between the passageways. The passageways are so spaced that there is a coupling of acoustic energy affected through the open celled material forming the walls between adjacent passageways.

The passageways formed in the block of open celled material are preferably elongated narrow passageways so that the acoustic resistance of the passageway is high and the passageways are spaced closely together so that interaction between passageways is possible through the walls of adjacent passageways.

For the attenuation of high frequencies, where the wave length is less than the thickness of the filter, it is desirable to form sinuous passageways through the blocks of open celled cellular material. Although the pressure drop in the fluid medium flowing therethrough is slightly increased, the curvatures in the passageways provide a reflective means for the sound energy that contributes to the attenuation of the high frequency sound waves.

As an illustrative embodiment of my invention, an acoustic filter having recesses ⅛ inch wide and 7 inches high at the front and rear face were formed in open celled cellular blocks 9 inches thick. The recesses were cut on ¾ inch centers, thus forming a wall ⅝ inch thick between adjacent passageways. The depth of the recesses into the front and rear faces was controlled to obtain a 1½ inch overlap in one sample and a 3 inch overlap in another sample. To measure the performance of the acoustic filter at different thicknesses, portions of both the front and rear faces of the block were cut away to form acoustic filters having varying thicknesses. For example, where the recesses had a 3 inch overlap, portions of the front and rear faces of a 9 inch thick block were removed to provide an acoustic filter having a thickness of 5 inches. Where the recesses had a 1½ inch overlap, the 9 inch block was similarly modified to provide acoustic filters having 5 inch and 2 inch thicknesses. The performance of the acoustic filters having the different overlap of the recesses and different thicknesses was measured and is graphically illustrated in FIGURES 10 and 11. FIGURE 10 illustrates the performance of three acoustic filters of different thicknesses that had a 1½ inch overlap of the recesses. FIGURE 11 illustrates the performance of two acoustic filters of different thicknesses that had a 3 inch overlap of the recesses.

The method used to measure the performance of the acoustic filters constructed in the manner previously described follows. Bands of random noise one third octave wide were used as a noise source. The noise was randomly incident on one face of the acoustic filter. An anechoic termination was used at the receiving end. The attenuation of the filter was taken as the difference in sound pressure level as registered by two microphones, one close to the face of the filter on which sound was incident and the other in the anechoic space. No attempt was made to measure attenuation with air flow through the filter since the effect of air flow on attenuation is known to be small for reasonable air velocity. The measurements were repeated for several thicknesses of filter.

Although there is illustrated in FIGURES 7–9 an embodiment of the invention that includes elongated recessed portions that form sinuous passageways through a plurality of blocks of open celled cellular material, it should be understood it is not intended to limit the herein described invention to the particular configuration disclosed. Other suitable configurations may be used to provide a thin acoustic filter having the desirable properties herein described wherein the passageways for the flow of a fluid medium are formed in an open celled cellular material and the surfaces of the passageways serve as a sound absorbing medium.

The important requirement which is novel to this invention is that the passageways be so arranged that the acoustic resistance of the passage is near enough to the acoustic resistance of the porous wall separating two adjacent passageways to permit acoustic coupling between the two adjacent passageways. The improved acoustic filter herein described provides an acoustic impedance of the pasasgeways and an acoustic impedance of the walls between the passageways which, together, it is believed, have an acoustic impedance relationship that provides performance that is almost an order of magnitude better than has heretofore been achieved.

A series of tests for acoustic impedance were performed to illustrate that there is an acoustic interaction or coupling between the adjacent passageways and the porous walls therebetween. The procedures for measuring acoustic impedance are described in ASTM C384–58 entitled "Impedance and Absorption of Acoustical Materials by the Tube Method." These procedures were followed in measuring the impedance of the samples hereinafter discussed. The computational chart employed is the "Smith chart" discussed in Appendix II, paragraph A 2(b) in ASTM C384–58.

The equipment used in the tests included an impedance tube having a uniform cross section with rigid walls that transmit or absorb negligible sound energy. An audio signal generator coupled to a suitable transducer provided a source of sinusoidal plane waves at one end of the tube. At the other end of the tube the sample was mounted with a brass plug backing. Waves of reduced amplitude were reflected by the sample and combined with the incident waves to form a standing wave pattern along the tube. This wave pattern was observed by a movable microphone or probe tube that indicated the relative pressure amplitudes acting at the maximums and minimums in the standing wave pattern. As is set forth in ASTM C384–58, the acoustic impedance of the sample is derived from these measurements. The specific normal acoustic impedance is defined as the complex ratio of sound pressure to the component of particle velocity normal to the surface. Acoustic impedance consists of a real and an imaginary component, termed the specific acoustic resistance and the specific acoustic reactance respectively. The real component of acoustic impedance is a measure of the acoustic resistance in which the sound would be absorbed. The results of the various tests are represented in the tables as acoustic resistance (R/pc) and acoustic reactance (X/pc). The quantity pc is the characteristic impedance of air and is designated in units of rayls or dyne-sec./centimeter $^3$.

A first series of tests for acoustic impedance were performed wherein the acoustic impedance of several cylindrical samples of open-celled cellular glass having a diameter of 4″, the diameter of the tube, and different lengths, was measured to determine the acoustic interaction or coupling between passageways and the walls therebetween. One sample had a length of 2″ and a single .030″ wide slot extending laterally thereacross and throughout the length. The front face of the specimen was coated with an impervious coating of plaster ⅛″ thick. This gave an essentially infinite impedance to the surface so that the impedance being measured was characterized by the slot in the material and not the material at the face of the sample. The impedance measured, therefore, is a result of the slot in the sample. The acoustic resistance and acoustic reactance at various frequencies is set forth in Table I.

A second sample having substantially the same diameter and the same length was prepared having five laterally extending slots in the sample. The slots had a width of .030″, similar to the width of the slot in the first sample. Separating the slots were walls ½″ wide. The slots on opposite sides of the center slot, however, did not extend through to the front face of the sample and an impervious plaster coating ⅛″ thick was placed on the sample front face, except the area of the center slot. Thus, the front face of the second sample was the same as the front face of the first sample. The same impedance measurements were made and are tabulated below for comparison with the measurements made on the first sample. From the comparative impedance at the different frequencies it is apparent that the impedance is different, but the only thing that can be different is the acoustic character of the walls of the center slot, and the acoustic character of those walls can only have changed if there is an acoustic interaction or coupling between the slots or passageways and the material therebetween.

*Table I*

| Frequencies | Sample 1 | | Sample 2 | |
|---|---|---|---|---|
| | R/pc | X/pc | R/pc | X/pc |
| 125 | 1.90 | −6.00 | 3.00 | −6.50 |
| 250 | 4.80 | +2.00 | 2.80 | −1.00 |
| 500 | 3.40 | +7.50 | 2.40 | +4.60 |
| 1000 | 3.00 | +10.00 | 2.80 | +6.50 |
| 2000 | 4.00 | +4.80 | | |

A further series of tests were performed on a series of disc-like samples of open celled cellular glass ½″ thick and 4″ in diameter that were spaced from each other at preselected distances. Thus, air spaces of a preselected width were provided between the ½″ thick discs. The impedance was measured normal to the material face. It was observed that a series of at least four ½″ thick discs of cellular glass material and .030″ spaces therebetween is required to provide a constant impedance measurement. This data indicates the interaction or coupling between the slots or passageways and the material extends through at least three passageways and four walls separating the passageways. Table II sets forth these measurements.

Table II

| Frequencies | ¼″ material .030″ space | | ½″ material +.12″ space | | ¾″ material .12″ space | |
|---|---|---|---|---|---|---|
| | R/ρc | X/ρc | R/ρc | X/ρc | R/ρc | X/ρc |
| 1 disc, no space: | | | | | | |
| 125 | 10.00 | −40.00 | | | | |
| 250 | 10.00 | −25.00 | | | | |
| 500 | 6.00 | −12.00 | | | | |
| 1000 | 4.40 | +0.40 | | | | |
| 1 disc+1 air space: | | | | | | |
| 125 | 20.00 | −30.00 | 20.00 | −40.00 | 20.00 | −25.00 |
| 250 | 20.00 | −30.00 | 10.00 | −20.00 | 13.00 | −13.00 |
| 500 | 5.50 | −3.80 | 6.50 | −4.40 | 7.00 | −1.00 |
| 1000 | 5.00 | +2.20 | 4.20 | +4.00 | 9.00 | +5.00 |
| 2 discs+2 air spaces: | | | | | | |
| 125 | 8.00 | −16.00 | 10.00 | −13.00 | 20.00 | −10.00 |
| 250 | 8.00 | −8.00 | 8.00 | −7.00 | 20.00 | 0.00 |
| 500 | 6.00 | +2.20 | 6.00 | +3.00 | 12.00 | +4.00 |
| 1000 | 5.00 | +6.50 | 6.00 | +6.00 | 8.50 | +5.00 |
| 3 discs+3 air spaces: | | | | | | |
| 125 | 10.00 | −10.00 | 10.00 | −6.50 | 20.00 | −8.00 |
| 250 | 5.50 | −3.00 | 8.50 | −1.40 | 14.00 | −6.00 |
| 500 | 8.00 | +2.50 | 9.50 | +4.80 | 11.00 | +2.00 |
| 1000 | 6.50 | +4.80 | 7.00 | +3.50 | 8.50 | +5.00 |
| 4 discs+4 air spaces: | | | | | | |
| 125 | 7.00 | −6.00 | 10.00 | −5.00 | 20.00 | −8.00 |
| 250 | 3.60 | −3.00 | 7.50 | −2.00 | | |
| 500 | 12.00 | +2.00 | 10.00 | +5.00 | | |
| 1000 | 6.00 | +5.00 | 6.00 | +5.00 | | |

To illustrate the effect of sample length on the impedance at different frequencies the following tests were performed and are tabulated in Table III. The impedance of an open-celled cellular glass sample having different lengths and a single lateral slot of varying widths was measured with a backing of a brass plug. Other measurements were made with a backing of sound absorptive rock wool between the sample and the brass plug backing. Table III below gives the result of this experiment. In the case where the slotted porous cellular plugs are backed by brass, one expects sound entering the slot to be partially attenuated in the slot and partly reflected from the brass plug. In the experiments where the slotted porous cellular plug is backed by sound absorptive rock wool, little or no sound is reflected back from the far side of the slot. Hence, unless all the sound energy is absorbed by at most a double traverse of the slot, the measured impedance will be different for brass backed slots compared to that for rock wool backed slots. It will be observed in Table III that such a difference does indeed exist for the shorter slots but when the porous plug in which the slot is made becomes four inches long, the difference between the two measurements (brass backed vs. rock wool backed) falls within the normally accepted experimental error for this kind of experiment. Stated otherwise, a muffler 8″ long (twice the length of the sample) having slots of .030″ width would provide a substantially infinite acoustic resistance to the sound energy passing therethrough so that substantially all of the sound entering the slots would be attenuated before it reached the outlet portion of the muffler. These measurements illustrate it is now possible to obtain improved sound attenuation in mufflers having a relatively short length.

The slots or passageways may be cut or formed in the material otherwise than as illustrated in FIGURES 7–9. For example, an improved acoustic filter having the desired properties herein discussed can be fabricated from a unitary slab of open-celled cellular material by forming or cutting crossed slots therein. A first series of vertical slots are formed in the front face and extend into the slab a predetermined distance. The vertical slots terminate within the slab at a location between the front face and the rear face, preferably adjacent the rear face. A second series of horizontal slots are formed in the rear face and extend into the slab a predetermined distance. The slots terminate within the slab at a location between the rear face and the front face, preferably adjacent the front face. The horizontal and vertical slots should be such that the slab of material remains in one piece and the slots extending from the respective faces penetrate the slab a distance greater than one-half the thickness of the slab so that the horizontal and vertical slots overlap. The slots formed in the open-celled cellular material do not have to be the same width nor do they have to be the same distance apart. There should be, however, as previously discussed, an acoustic interaction between the slot and the open-celled cellular material therebetween. The slots should be dimensioned so that the acoustic resistance of the slot is such that the acoustic interaction between the slots and the adjacent material is effective. The slots can also be arranged in planes other than the horizontal and vertical planes previously described. The slots or passageways do not have to be uniform in dimension and the spacing of the passageways may vary from passageway to passageway to provide the desired acoustic effect.

Table III

| Frequencies | .030″ slot | | .060″ slot | |
|---|---|---|---|---|
| | R/ρc | X/ρc | R/ρc | X/ρc |
| 1″ sample, brass plug backing: | | | | |
| 125 | 10.00 | −6.00 | | |
| 250 | 9.00 | −3.00 | | |
| 500 | 10.00 | −1.00 | | |
| 1000 | 4.80 | +9.00 | | |
| 2000 | 3.00 | +9.00 | | |
| 1″ sample, 2″ rockwool backing and brass plug backing: | | | | |
| 125 | 2.00 | −6.00 | | |
| 250 | 3.60 | +1.60 | | |
| 500 | 3.00 | +7.00 | | |
| 1000 | 50.00 | +8.00 | | |
| 2000 | 2.40 | +9.50 | | |
| 2″ sample, brass plug backing: | | | | |
| 125 | 1.90 | −6.00 | 3.00 | −6.00 |
| 250 | 4.80 | +2.00 | 4.30 | −1.00 |
| 500 | 3.40 | +7.50 | 5.00 | +4.40 |
| 1000 | 3.00 | +10.00 | 2.50 | +7.50 |
| 2000 | 4.00 | +4.80 | 1.40 | +3.40 |
| 2″ sample, rockwool backing and brass plug backing: | | | | |
| 125 | 3.00 | −.10 | 2.20 | −0.30 |
| 250 | 3.60 | +4.40 | 3.00 | +3.80 |
| 500 | 5.00 | +11.00 | 1.60 | +5.50 |
| 1000 | 50.00 | +8.50 | 1.40 | +8.00 |
| 2000 | 2.80 | +4.40 | 1.40 | +3.40 |
| 4″ sample, brass plug backing: | | | | |
| 125 | 3.20 | +0.20 | | |
| 250 | 4.00 | +7.00 | | |
| 500 | 4.80 | +7.50 | | |
| 1000 | 3.00 | +10.00 | | |
| 2000 | 2.00 | +8.00 | | |

| Frequencies | .030″ slot | | .060″ slot | |
|---|---|---|---|---|
| | R/ρc | X/ρc | R/ρc | X/ρc |
| 4″ sample, rockwool backing and brass plug backing: | | | | |
| 125 | 2.90 | +2.40 | | |
| 250 | 5.00 | +7.50 | | |
| 500 | 9.00 | +8.50 | | |
| 1000 | 5.50 | +12.00 | | |
| 2000 | 3.00 | +9.00 | | |
| 2″ sample, 2 slots ½″ apart and brass plug backing: | | | | |
| 125 | 3.00 | −7.00 | | |
| 240 | 2.70 | −0.55 | | |
| 500 | 6.00 | +5.00 | | |
| 1000 | 5.00 | +6.50 | | |
| 2000 | 50.00 | +30.00 | | |

The impedance of composite material comprising cellular glass nodules having open cells and an organic foamed binder material was measured. Slots of different widths were formed in the samples and the following results were obtained.

*Table IV*

| Frequencies | .030″ slot | | .060″ slot | | .12″ slot | |
|---|---|---|---|---|---|---|
| | R/ρc | X/ρc | R/ρc | X/ρc | R/ρc | X/ρc |
| 2″ composite, ⅝″ nodules, urethane foam: | | | | | | |
| 125 | 8.00 | −6.00 | 16.00 | −2.00 | 4.00 | −7.50 |
| 250 | 8.00 | +1.00 | 5.50 | −1.40 | 4.20 | −2.40 |
| 500 | 8.00 | +4.00 | 9.00 | +0.20 | 6.00 | +3.00 |
| 1000 | 10.00 | +11.00 | 2.20 | +6.50 | 4.40 | +4.80 |
| 2″ composite, rockwool backing: | | | | | | |
| 125 | 3.00 | +.70 | 2.50 | −.60 | 1.60 | +0.10 |
| 250 | 7.00 | +3.00 | 6.00 | +3.50 | 5.00 | +4.00 |
| 500 | 6.50 | +8.50 | 5.50 | +4.50 | 6.50 | +6.50 |
| 1000 | 12.00 | +12.00 | 4.00 | +8.50 | 7.00 | +5.00 |
| 2000 | 50.00 | +5.50 | 5.00 | +5.00 | 7.00 | +5.00 |
| 3″ composite: | | | | | | |
| 125 | 5.00 | −0.40 | | | | |
| 250 | 3.30 | +3.30 | | | | |
| 500 | 3.50 | +8.50 | | | | |
| 1000 | 2.40 | +19.00 | | | | |
| 2000 | 2.00 | +10.00 | | | | |

Slots or passageways at an angle of 45° to the face of the sample were made and the impedance was measured. Also circular apertures having a diameter of .06″ were punched into the composite material and the impedance was measured. The measurements are set forth in Table V below.

*Table V*

| Frequencies | .060″ slot | | Punched .060″ diameter | |
|---|---|---|---|---|
| | R/ρc | X/ρc | R/ρc | X/ρc |
| 2″ composite, 45° angle slot: | | | | |
| 125 | 7.50 | −5.00 | | |
| 250 | 10.00 | 00.00 | | |
| 500 | 5.50 | +3.00 | | |
| 1000 | 4.00 | +8.50 | | |
| 2000 | 3.00 | +9.00 | | |
| 2″ composite, 2 45° angle slots: | | | | |
| 125 | 4.20 | −7.50 | | |
| 250 | 6.00 | −2.80 | | |
| 500 | 3.20 | +1.00 | | |
| 1000 | 5.00 | +6.00 | | |
| 2000 | 14.00 | 00.00 | | |
| 2″ composite: | | | | |
| 125 | | | 3.50 | −6.50 |
| 250 | | | 5.50 | −0.60 |
| 500 | | | 2.70 | +1.40 |
| 1000 | | | 2.80 | +6.00 |
| 2000 | | | 9.00 | 0.00 |

The use of sound absorbing material for lining a passageway to absorb sound is well known. Depending on frequency, type of lining used and size of duct, such a lined duct will have from about 0.2 to about 2.0 decibels of attenuation per foot of length. Much work has been done on improving the efficiency of these linings because the length needed for sufficient attenuation is often important. United States Patents #2,853,147, to D. D'Eustachio, #3,087,572, and #3,087,575, to J. J. Baruch et al., are some examples. These improved versions, again depending on frequency, type of lining and size of duct, can achieve 4 to 10 decibels per foot of length. This is still, as can be seen from FIGURE 10, far less than the present filter. As an illustration, FIGURE 10 shows nearly 10 decibels of attenuation at 400 cycles per second in a filter thickness of 2 inches.

Acoustic systems constructed in accordance with the various illustrated embodiments of the invention constitute extremley effective sound absorbers. In addition, the filters can be constructed of open celled materials such as open celled cellular glass or open celled composite materials which exhibit a high internal damping and have enough mass to prevent transmission of sound through the filter material as would happen if the filter material were light enough and elastic enough to be mechanically driven by the sound on the high noise side of the filter.

In the embodiment of this invention, one form of which is illustrated in FIGURES 7 through 9, the air handling capacity is determined by the number of passageways that are in parallel, and the degree of attenuation by the length of the passageways. In this manner, any desired air handling capacity and any needed attenuation can be achieved. In all cases, the thickness of the filter, that is the dimension in direction of the fluid flow, will be substantially less than can be achieved with other known types of filters.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A sound absorber comprising a plurality of slabs of dimensionally stable open-celled cellular material positioned in spaced-apart side by side relationship, whereby the opposed inner faces of said slabs define a channel along which sound may flow longitudinally, each of said slabs having a plurality of recesses extending into the same from its inner face, the inner portions of adjacent recesses being disposed in sufficient proximity with each other so that coupling of acoustic energy is effected through the open-celled material therebetween, the depth of said recesses entering said slabs at different positions along the length of said channel being of different magnitude so as to form a pattern of recesses of varying depth along said channel, and hence a pattern of acoustic impedance, the dimensions of selected ones of said recesses being determined by particular sound frequencies to effect resonance in the selected recesses and thereby increase the transmission of acoustic energy therethrough, said increased acoustic energy being damped by the open-celled cellular material to provide optimum acoustic impedance.

2. A sound absorber comprising a plurality of slabs of dimensionally stable open-celled cellular material positioned in spaced-apart side by side relationship, whereby the opposed inner faces of said slabs define a channel along which sound may flow longitudinally, each of said slabs having a plurality of recesses extending into the same from its inner face, the inner portions of adjacent recesses being disposed in sufficient proximity with each other so that coupling of acoustic energy is effected through the open-celled material therebetween, the depth of said recesses entering said slabs at different positions along the length of said channel being of different magnitude so as to form a pattern of recesses of gradually varying depth along said channel, and hence a pattern of acoustic impedance, said pattern being repeated at measured intervals such that at certain positions in said channel the depth of said recesses, and hence the acoustic impedance, changes abruptly from a relatively low value to a relatively high value to create an impedance mismatch at said abrupt changes.

3. A sound absorber comprising a plurality of slabs of dimensionally stable open-celled cellular material positioned in spaced-apart side by side relationship, whereby the opposed inner principal faces of said slabs define a channel along which sound may flow longitudinally, each of said slabs having a plurality of recesses extending into the same from each of the principal faces thereof, the inner portions of adjacent recesses in opposite, principal faces of each slab being disposed in sufficient proximity with each other so that coupling of acoustic energy is effected through the open-celled material therebetween, the depth of said recesses entering said slabs at different positions along the length of said channel being of different magnitude so as to form a pattern of recesses of varying depth along said channel, and hence a pattern of acoustic impedance, the dimensions of selected ones of said recesses being determined by particular sound frequencies to effect resonance in the selected recesses and thereby increase the transmission of acoustic energy therethrough, said increased acoustic energy being damped by the open-celled cellular material to provide optimum acoustic impedance.

4. A sound absorber comprising a plurality of slabs of dimensionally stable open-celled cellular material positioned in space-apart side by side relationship, whereby the opposed inner principal faces of said slabs define a channel along which sound may flow longitudinally, each of said slabs having a plurality of recesses extending into the same from each of the principal faces thereof, the recesses extending into each slab from one principal face being interleaved in overlapping but non-intersecting relationship with the recesses extending from the other principal face, the interleaved portions of the recesses in each of said slabs being arranged in accordance with a repeated pattern along the length of said channel, and hence a repeated pattern of acoustic impedance.

5. A sound absorber comprising a plurality of slabs of dimensionally stable open-celled cellular material positioned in spaced-apart side by side relationship, whereby the opposed inner principal faces of said slabs define a channel along which sound may flow longitudinally, each of said slabs having a plurality of recesses extending into the same from each of the principal faces thereof, the recesses extending into each slab from one principal face being interleaved in overlapping but non-intersecting relationship with the recesses extending from the other principal face, the depths of said recesses entering each of said principal faces of said slabs at different positions along the length of said channel being of different magnitude so as to form a pattern of recesses of gradually varying depth along said channel, and hence a pattern of acoustic impedance, said pattern being repeated at measured intervals such that at certain positions in said channel the depth of said recesses, and hence the acoustic impedance, changes abruptly from a relatively low value to a relatively high value to create an impedance mismatch at said abrupt changes.

6. A sound absorber comprising a plurality of slabs of dimensionally stable open-celled cellular material positioned in spaced-apart side by side relationship, whereby the opposed inner faces of said slabs define a channel along which sound may flow longitudinally, each of said slabs having a plurality of recesses extending into the same from its inner face, the depth of said recesses entering said slabs at different positions along the length of said channel being of different magnitude so as to form a pattern of recesses of gradually varying depth along said channel, and hence a pattern of acoustic impedance, said pattern being repeated at measured intervals such that at certain positions in said channel the depth of said recesses, and hence the acoustic impedance, changes abruptly from a relatively low value to a relatively high value to create an impedance mismatch at said abrupt changes, the points of abrupt change being spaced apart longitudinally of said channel approximately one-half wavelength for certain principal sound frequencies which the installation is designed to absorb.

7. A sound absorber comprising a plurality of slabs of dimensionally stable open-celled cellular material positioned in spaced-apart side by side relationship, each of said slabs having an inner face and an outer face thereon extending in substantially flat, parallel planes, the opposed inner faces of said slabs defining a channel along which sound may flow longitudinally, each of said slabs having a plurality of recesses extending into the same from each of said faces thereof, the inner portions of adjacent recesses in the faces of each slab being disposed in sufficient proximity with each other so that coupling of acoustic energy is effected through the open-celled cellular material therebetween, the depth of said recesses entering each said face at different positions along the length of said channel being of different magnitude so as to form a pattern of recesses of gradually varying depth along said channel, and hence a pattern of acoustic impedance, said pattern being repeated at measured intervals such that at certain positions in said channel the depth of said recesses, and hence the acoustic impedance, changes abruptly from a relatively low value to a relatively high value to create an impedance mismatch at said abrupt changes, the points of abrupt change being spaced apart longitudinally of said channel approximately one-half wavelength for certain principal sound frequencies which the installation is designed to absorb.

8. A sound absorber comprising a plurality of slabs of dimensionally stable open-celled cellular material positioned in spaced-apart side by side relationship, each of said slabs having an inner face and an outer face thereon extending in substantially flat, parallel planes, the opposed inner faces of said slabs defining a channel along which sound may flow longitudinally, each of said slabs having a plurality of recesses extending into the same from its inner face and from its outer face, the recesses extending into each slab from said inner face being interleaved in overlapping but nonintersecting relationship with the recesses extending from said outer face, the depths of said recesses entering each of said faces of said slabs at different positions along the length of said channel being of different magnitude so as to form a pattern of recesses of gradually varying depth along said channel, and hence a pattern of acoustic impedance, said pattern being repeated at measured intervals such that at certain positions in said channel the depth of said recesses, and hence the acoustic impedance, changes abruptly from a relatively low value to a relatively high value to create an impedance mismatch at said abrupt changes, the points of abrupt change being spaced apart longitudinally of said channel approximately one-half wavelength for certain principal sound frequencies which the installation is designed to absorb.

9. In a sound absorbing system, an elongated slab of dimensionally stable open-celled cellular material having a longitudinal face thereon extending in a substantially flat plane, said slab having a plurality of recesses extending into the same from said face, the inner portions of adjacent recesses being disposed in sufficient proximity with each other so that coupling of acoustic energy is effected through the open-celled material therebetween, the depth of said recesses entering said slab at different positions along the length thereof being of different magnitude so as to form a pattern of recesses of gradually varying depth along said length, and hence a repeated pattern of acoustic impedance, said pattern being repeated at measured intervals along the length of said slab such that at said intervals the depth of said recesses, and hence the acoustic impedance, changes abruptly from a relatively low value to a relatively high value to create an impedance mismatch at said abrupt changes.

10. In a sound absorbing system, an elongated slab of dimensionally stable open-celled cellular material having a longitudinal face thereon extending in a substantially flat plane, said slab having a plurality of recesses extending into the same from said face, the depth of said recesses entering said slab at different positions along the length thereof being of different magnitude so as to form a pattern of recesses of gradually varying depth along said length, and hence a pattern of acoustic impedance, said pattern being repeated at measured intervals such that at certain positions along said length the depth of said recesses, and hence the acoustic impedance, changes abruptly from a relatively low value to a relatively high value to create an impedance mismatch at said abrupt changes, the points of abrupt change being spaced apart approximately one-half wavelength for certain principal sound frequencies which the system is designed to absorb, the dimensions of selected ones of said recesses being determined by particular sound frequencies to effect resonance in the selected recesses and thereby increase the transmission of acoustic energy therethrough, said increased acoustic energy being damped by the open-celled cellular material to provide optimum acoustic impedance.

11. In a sound absorbing system, an elongated slab of dimensionally stable open-celled cellular material having a pair of oppositely disposed longitudinal faces thereon extending in substantially flat parallel planes, said slab having a plurality of recesses extending into the same from each of said faces, the recesses extending into said slab from one of said faces being interleaved in overlapping but non-intersecting relationship with the recesses extending from the other of said faces, the depth of said recesses entering each face of said slab at different positions along the length thereof being of different magnitude so as to form a pattern of recesses of gradually varying depth along said length, and hence a pattern of acoustic impedance, said pattern being repeated at measured intervals such that at certain positions along said length the depth of said recesses, and hence the acoustic impedance, changes abruptly from a relatively low value to a relatively high value to create an impedance mismatch at said abrupt changes, the points of abrupt change being spaced apart along said length approximately one-half wavelength for certain principal sound frequencies which the system is designed to absorb.

12. A sound absorbing system of the type wherein a fluid medium is adapted to flow longitudinally through a confined space, said system comprising a first and a second slab of dimensionally stable open-celled cellular material positioned in spaced, side by side relationship with each other within said space, each of said slabs having a pair of oppositely disposed principal faces thereon and having a plurality of recesses extending into each face thereof, the inner portions of adjacent recesses in opposite, principal faces of each slab being in overlapping but non-intersecting relationship with each other and being spaced sufficiently close together so that coupling of acoustic energy is effected through the open-celled cellular material between said inner portions, said inner portions of the recesses in each of said slabs being arranged in accordance with a predetermined pattern to thereby provide a predetermined pattern of acoustic impedance.

13. A sound absorbing system of the type wherein a fluid medium is adapted to flow longitudinally through a confined space, said system comprising a first and a second slab of dimensionally stable open-celled cellular material positioned in longitudinally extending, spaced-apart relationship with each other on opposite sides of the path of said fluid medium within said space, each of said slabs having a pair of oppositely disposed, principal faces thereon, one of the principal faces of each of said slabs being positioned adjacent said fluid path and having at least a portion thereof extending in a substantially flat plane, and each of said slabs having a plurality of recesses extending into each face thereof, the recesses extending into each slab from one face being interleaved in overlapping but non-intersecting relationship with the recesses extending from the opposite face, the adjacent recesses being in sufficient proximity with each other so that coupling of acoustic energy is effected through the open-celled material thereadjacent, the depths of the recesses entering each of said principal faces at different positions along the length thereof being of different magnitude so as to form a pattern of recesses of gradually varying depth along said path, and hence a pattern of varying acoustic impedance, said pattern being repeated at measured intervals along the length of each slab such that at said intervals the depth of the recesses, and hence the acoustic impedance, changes abruptly from a relatively low value to a relatively high value to create an impedance mismatch at said abrupt changes.

14. A sound absorbing system as defined in claim 13 in which a third and a fourth slab of open-celled cellular material are positioned in spaced-apart relationship with said first and second slabs, respectively.

15. A sound absorbing system of the type wherein a fluid medium is adapted to flow longitudinally through a confined space, said system comprising a first and a second slab of dimensionally stable open-celled cellular material positioned in longitudinally extending, spaced-apart relationship with each other on opposite sides of the path of said fluid medium within said space, each of said slabs having a pair of oppositely disposed, principal faces thereon, one of the principal faces of each of said slabs being positioned adjacent said fluid path, said one of the principal faces of each slab having a first portion thereof extending in a first, substantially flat plane at a diverging angle with respect to the direction of said path and having a second portion thereof extending in a second, substantially flat plane at a converging angle with respect to the direction of said path, and each of said slabs having a plurality of recesses extending into each face thereof, the recesses extending into each slab from one face being interleaved in overlapping relationship in sufficient proximity with the recesses extending from the opposite face so that coupling of acoustic energy is effected through the open-celled material thereadjacent, the depths of the recesses entering each of said principal faces at different positions along the length thereof being of different magnitude so as to form a pattern of recesses of gradually varying depth along said path, and hence a pattern of varying acoustic impedance, said pattern being repeated at measured intervals along the length of each slab such that at said intervals the depth of the recesses, and hence the acoustic impedance, changes abruptly from a relatively low value to a relatively high value to create an impedance mismatch at said abrupt changes.

16. A sound absorbing system comprising a plurality of slabs of dimensionally stable open-celled cellular material positioned in longitudinally extending, side by side relationship with each other, each of said slabs having oppositely disposed principal faces thereon extending in substantially flat, parallel planes, the opposed principal faces of selected pairs of said slabs being spaced apart to thereby define a plurality of channels along which sound may flow longitudinally, each of said slabs having a plurality of recesses extending into each principal face thereof, the inner ends of the recesses extending into each slab from one face being interleaved in overlapping but non-intersecting relationship with the inner ends of the recesses extending from the opposite face, the adjacent inner ends being in sufficient proximity with each other so that coupling of acoustic energy is effected through the open-celled material thereadjacent, the depths of the recesses entering each of said faces at different positions along the length thereof being of different magnitude so as to form a pattern of recesses of gradually varying depth along said length, and hence a pattern of varying acoustic impedance, said pattern being repeated at measured intervals along the length of each slab such that at said intervals the depth of the recesses, and hence the acoustic impedance, changes abruptly from a relatively low value to a relatively high value to create an impedance mismatch at said abrupt changes.

17. A sound absorbing system comprising a plurality of slabs of dimensionally stable open-celled cellular material positioned in longitudinally extending, spaced-apart relationship with each other, each of said slabs having oppositely disposed principal faces thereon extending in substantially flat, parallel planes, the opposed principal faces of selected pairs of said slabs defining a plurality of channels along which sound may flow longitudinally, two of said spaced-apart slabs being provided between adjacent channels, each of said slabs having a plurality of recesses extending into each principal face thereof, the inner ends of the recesses extending into each slab from one face being interleaved in overlapping but non-intersecting relationship with the inner ends of the recesses extending from the opposite face, the adjacent inner ends being in sufficient proximity with each other so that coupling of acoustic energy is effected through the open-celled material thereadjacent, the depths of the recesses entering each of said faces at different positions along the length thereof being of different magnitude so as to form a pattern of recesses of gradually varying depth along said length, and hence a pattern of varying acoustic impedance, said pattern being repeated at measured intervals along the length of each slab such that at said intervals the depth of the recesses, and hence the acoustic impedance, changes abruptly from a relatively low value to a relatively high value to create an impedance mismatch at said abrupt changes.

18. A sound absorbing system as defined in claim 17 in which said pattern of recesses is such that the points at which the depth of said recesses, and hence the acoustic impedance, changes abruptly from a relatively low value to a relatively high value are spaced apart approximately one-half wavelength for certain principal sound frequencies which the system is designed to absorb.

19. A sound absorbing system as defined in claim 17 in which means is provided between said two of said spaced-apart slabs for providing an additional pattern of varying acoustic impedance along the length of the channels thereadjacent.

20. A sound absorbing system of the type wherein a fluid medium is adapted to flow longitudinally through a confined space, said system comprising a first and a second slab of open-celled cellular glass positioned in longitudinally extending, spaced-apart relationship with each other on opposite sides of the path of said fluid medium within said space, each of said slabs having a pair of substantially parallel, opposite principal faces thereon, one of the principal faces of each of said slabs being positioned adjacent said fluid path and having at least a portion thereof extending in a substantially flat plane, and each of said slabs having a plurality of recesses extending at continuously varying depths into the same from each principal face thereof, the recesses extending into each slab from one principal face being interleaved in overlapping but non-intersecting relationship with the recesses extending from the opposite principal face, the adjacent recesses being in sufficient proximity with each other so that coupling of acoustic energy is effected through the open-celled material thereadjacent, the depths of the recesses in each of said principal faces being determined in accordance with a zigzag pattern extending in a substantially longitudinal direction with respect to said slabs, said zigzag pattern being repeated at measured intervals along said longitudinal direction to thereby provide abrupt changes in the depth of the recesses in each of said slabs at said intervals to create an impedance mismatch at said abrupt changes.

21. A sound absorbing system of the type wherein air is adapted to flow longitudinally through an elongated duct, said system comprising a first and a second slab of open-celled cellular glass positioned in longitudinally extending, spaced-apart relationship with each other on opposite sides of the path of said air within said duct, each of said slabs having a pair of oppositely disposed, principal faces thereon, one of the principal faces of each of said slabs being positioned adjacent said air path and having at least a portion thereof extending in a substantially flat plane, and each of said slabs having a plurality of slots extending at continuously varying depths into the same from each principal face thereof, the slots extending into each slab from one principal face being interleaved in overlapping but non-intersecting relationship with the slots extending from the opposite principal face, the adjacent slots being in sufficient proximity with each other so that coupling of acoustic energy is effected through the open-celled material theradjacent, the depths of the slots in each of said principal faces being determined in accordance with a zigzag pattern extending in a substantially longitudinal direction with respect to said slabs, said zigzag pattern being repeated at measured, one-half wavelength intervals along said longitudinal direction to thereby provide abrupt changes in the depths of the slots in each of said slabs at said intervals to create an impedance mismatch at said abrupt changes.

22. A sound absorber comprising a plurality of dimensionally stable slabs of open-celled cellular material positioned in spaced apart side by side relationship, each of said slabs having a plurality of slots extending into the same from at least one principal face thereof, each said slot meeting the corresponding slab face at an angle other than 90°, the inner portions of adjacent slots being disposed in sufficient proximity with each other so that coupling of acoustic energy is effected through the open-celled material therebetween, the depths of the slots entering each slab at different positions along the length thereof, when measured in directions perpendicular to the corresponding face, being of different magnitude so as to form a pattern of slots of gradually varying depth, and hence a pattern of gradually varying acoustic impedance.

23. A sound absorber of the character set forth in claim 22, in which the opposed inner faces of said slabs define a channel along which sound may flow longitudinally, said slots extending into the corresponding slab from the inner face thereof and meeting the same at angles less than 90°, when measured with respect to the direction of flow of the sound in said channel.

24. A sound absorber comprising a plurality of slabs of open-celled cellular material positioned in spaced apart side by side relationship, each of said slabs having a plurality of slots extending into the same from at least one of the principal faces thereof, the inner portions of each of said slots being disposed along an arcuate path and in sufficient proximity with an adjacent slot so that coupling of acoustic energy is effected through the open-celled material therebetween, the depth of the slots entering each slab at different positions along the length thereof being of different magnitude so as to form a pattern of recesses of gradually varying depth, and hence a pattern of gradually varying acoustic impedance.

25. A sound absorber comprising a plurality of dimensionally stable slabs of open-celled cellular material positioned in spaced apart parallel relationship, whereby the opposed inner principal faces of said slabs define a channel along which sound may flow longitudinally, each of said slabs having a plurality of recesses extending into the same from each of the principal faces thereof, the sum of the depth of each recess entering one face of a slab and the depth of an immediately adjacent recess entering the opposite face, when measured in directions perpendicular to said faces, being greater than the slab thickness, the recesses extending into each slab from said one face being interleaved in overlapping but non-intersecting relationship with the recesses extending from the other face, the interleaved portions of the recesses in each of said slabs being arranged in accordance with a repeated pattern along the length of said channel, and hence a repeated pattern of acoustic impedance.

26. A sound absorber of the character set forth in claim 25 in which the dimensions of selected ones of said recesses are determined by particular frequencies of the sound flowing along said channel to effect resonance in the selected recesses and thereby increase the transmission of sound energy therethrough, said increased sound energy being damped by the open-celled cellular material to provide optimum acoustic impedance.

27. A sound absorbing system comprising a plurality of dimensionally stable slabs of open-celled cellular material positioned in longitudinally extending spaced-apart relationship with each other, each of said slabs having oppositely disposed principal faces thereon extending in substantially flat, parallel planes, the opposed principal faces of selected pairs of said slabs defining a plurality of channels along which sound may flow longitudinally, two of said spaced-apart slabs being provided between adjacent channels, each of said slabs having a plurality of recesses extending into each principal face thereof, the inner ends of the recesses extending into each slab from one face being interleaved in overlapping but non-intersecting relationship with the inner ends of the recesses extending from the opposite face, the adjacent inner ends being in sufficient proximity with each other so that coupling of acoustic energy is effected through the open-celled material thereadjacent, the depths of the recesses entering each of said faces at different positions along the length thereof being of different magnitude so as to form a pattern of recesses of gradually varying depth along said length, and hence a pattern of varying acoustic impedance, and means including an imperforate sheet of non-sound absorptive material interposed in the space between said two slabs for providing an additional pattern of varying acoustic impedance along the length of the channels thereadjacent.

28. In an acoustic filter, an elongated slab having a plurality of elongated blocks of open-celled cellular material positioned in overlying relation to each other, each of said blocks having a front face, a rear face, a top surface and a bottom surface, a plurality of spaced upper front recesses formed in certain of said blocks intersecting said front face and said top surface, said upper front recesses terminating within said blocks, a plurality of spaced rear lower recesses formed in certain of said blocks and intersecting said rear face and said bottom surface, said lower rear recesses terminating within said blocks, said recesses so spaced in said blocks and said blocks so positioned in overlying relation with each other that said upper front recesses are in overlying relation with said lower rear recesses of said block positioned thereabove to form passageways through said slab, said elongated slab arranged to be positioned substantially normal to the flow of a fluid medium and in the path of sound energy, said passageways in said elongated slab forming openings for the flow of said fluid medium therethrough, the internal surfaces of said passageways having sound energy absorption properties for attenuating the sound energy flowing through said passageway.

29. In an acoustic filter, an elongated slab having a plurality of elongated blocks of open-celled cellular material positioned in overlying relation with each other, each of said blocks having a front face, a rear face, a top surface and a bottom surface, a plurality of regularly spaced upper front vertical recesses formed in said blocks intersecting said front face and said top surface, said upper front vertical recesses terminating within said blocks, a plurality of regularly spaced lower rear vertical recesses formed in said blocks intersecting said rear face and said bottom surface, said lower rear vertical recesses terminating within said blocks and formed in substantially the same vertical plane with said upper front vertical recesses, said upper front vertical recesses and said lower rear vertical recesses terminating within said block in a manner that a first dividing wall of open-celled cellular material is formed therebetween, said elongated blocks each having a plurality of regularly spaced lower front vertical recesses formed therein between said upper front vertical recesses, said lower front vertical recesses intersecting said front face and said bottom surface and terminating within said block, said block having a plurality of regularly spaced upper rear vertical recesses formed in said block between said lower rear vertical recesses and intersecting said rear face and said top surface, said upper rear vertical recesses formed in said block in substantially the same vertical plane as said lower front vertical recesses, said lower front vertical recesses and said upper rear vertical recesses terminating within said elongated block to form a second dividing wall therebetween, said blocks positioned in overlying relation with each other so that the upper front vertical recesses are in overlying relation with said lower rear vertical recesses of said block positioned thereabove and said lower front vertical recesses are in overlying relation with the upper rear vertical recesses of said block positioned therebelow to form a plurality of passageways through said elongated slab, said elongated slab arranged to be positioned substantially normal to the flow of a fluid medium and in the path of sound energy, said passageways in said elongated slab forming openings for the flow of said fluid medium therethrough, said passageway internal surfaces formed of said open-celled cellular material and having sound energy absorption properties for attenuating the sound energy flowing through said passageways.

30. An acoustic filter as set forth in claim 29 in which said first and second dividing walls being of such a dimension that coupling of acoustic energy is effected through the open-celled cellular material forming said first and second dividing walls to thereby further attenuate the sound energy flowing through said passageways.

31. An acoustic filter as set forth in claim 29 in which said adjacent passageways are positioned in sufficient proximity with each other so that a coupling of acoustic energy is effected through the open-celled cellular material therebetween for attenuating the sound energy flowing through said passageways.

32. An acoustic filter as set forth in claim 29 in which said passageways are sinuous to provide reflective surfaces for the sound energy to attenuate the high frequency sound energy flowing therethrough.

33. An acoustic filter as set forth in claim 29 in which said passageways are formed substantially normal to the front face of said elongated slab.

34. An acoustic filter as set forth in claim 29 in which said recesses formed in said blocks are elongated recesses forming elongated lateral walls between adjacent passageways.

References Cited by the Examiner

UNITED STATES PATENTS

| | | | |
|---|---|---|---|
| 1,554,180 | 9/25 | Trader | 181—33.1 |
| 2,042,487 | 6/36 | Sloan | 181—33 |
| 2,114,546 | 4/38 | Slayter | 181—33.1 |
| 2,123,536 | 7/38 | Long | 181—33 |
| 2,127,867 | 8/38 | Harvey | 181—33.1 |
| 2,671,522 | 3/54 | Bourgeois | 181—33.1 |
| 2,703,627 | 3/55 | D'Eustachio | 181—33.1 |
| 2,853,147 | 9/58 | D'Eustachio | 181—50 |
| 2,856,323 | 10/58 | Gordon | 181—33.1 |
| 3,113,635 | 12/63 | Allen et al. | 181—46 XR |

FOREIGN PATENTS

| | | |
|---|---|---|
| 910,923 | 2/46 | France. |
| 133,356 | 10/51 | Sweden. |

LEO SMILOW, *Primary Examiner.*